(12) United States Patent
Mizusaki et al.

(10) Patent No.: US 11,384,169 B2
(45) Date of Patent: Jul. 12, 2022

(54) SEALANT COMPOSITION, LIQUID CRYSTAL CELL, AND METHOD OF PRODUCING LIQUID CRYSTAL CELL

(71) Applicant: SHARP KABUSHIKI KAISHA, Osaka (JP)

(72) Inventors: Masanobu Mizusaki, Sakai (JP); Tadashi Ohtake, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 481 days.

(21) Appl. No.: 16/328,503

(22) PCT Filed: Aug. 18, 2017

(86) PCT No.: PCT/JP2017/029631
§ 371 (c)(1),
(2) Date: Feb. 26, 2019

(87) PCT Pub. No.: WO2018/038016
PCT Pub. Date: Mar. 1, 2018

(65) Prior Publication Data
US 2021/0139615 A1    May 13, 2021

(30) Foreign Application Priority Data
Aug. 26, 2016  (JP) .................. 2016-165597

(51) Int. Cl.
*C08F 2/50* (2006.01)
*C08K 5/33* (2006.01)
(Continued)

(52) U.S. Cl.
CPC ............ *C08F 2/50* (2013.01); *C08K 5/33* (2013.01); *C09K 19/04* (2013.01); *C09K 19/544* (2013.01);
(Continued)

(58) Field of Classification Search
CPC ................... C09K 2323/057; G02F 1/1339
See application file for complete search history.

(56) References Cited

U.S. PATENT DOCUMENTS 5,771,084 A * 6/1998 Fujimori .............. G02F 1/1339
                                                    349/153
5,876,805 A   3/1999 Ostlie
(Continued)

FOREIGN PATENT DOCUMENTS

CN    101351482 A    1/2009
CN    103003742 A    3/2013
(Continued)

OTHER PUBLICATIONS

English translation of JP2003313216. (Year: 2003).*

*Primary Examiner* — Chanceity N Robinson
*Assistant Examiner* — Anna Malloy
(74) *Attorney, Agent, or Firm* — ScienBiziP, P.C.

(57) ABSTRACT

A sealant composition with which a decrease in voltage holding rate is less likely to occur in a liquid crystal cell for a scanning antenna, the sealant composition according to the present invention includes a photo-radical polymerization initiator that generates a radical through application of light with a wavelength of 450 nm or greater and a polymerization component that contains a polymerizable functional group that is polymerizable using the radical.

10 Claims, 11 Drawing Sheets

(51) Int. Cl.
*C09K 19/04* (2006.01)
*C09K 19/54* (2006.01)
*G02F 1/1339* (2006.01)
*G02F 1/1343* (2006.01)
*H01Q 3/34* (2006.01)

(52) U.S. Cl.
CPC .......... *G02F 1/1339* (2013.01); *G02F 1/1343* (2013.01); *H01Q 3/34* (2013.01); *C09K 2019/0444* (2013.01); *C09K 2323/027* (2020.08); *C09K 2323/057* (2020.08)

(56) References Cited

U.S. PATENT DOCUMENTS

| | | | |
|---|---|---|---|
| 7,466,269 | B2 | 12/2008 | Haziza |
| 7,884,766 | B2 | 2/2011 | Haziza |
| 9,385,435 | B2 | 7/2016 | Bily et al. |
| 9,450,310 | B2 | 9/2016 | Bily et al. |
| 10,062,968 | B2 | 8/2018 | Bily et al. |
| 10,090,599 | B2 | 10/2018 | Bily et al. |
| 10,815,426 | B2 * | 10/2020 | Mizusaki ............... G02F 1/1368 |
| 10,947,416 | B2 * | 3/2021 | Mizusaki .................. C09J 5/00 |
| 2008/0036664 | A1 | 2/2008 | Haziza |
| 2009/0091500 | A1 | 4/2009 | Haziza |
| 2009/0173438 | A1 * | 7/2009 | Takeuchi ............... C08F 220/38 156/275.5 |
| 2012/0194399 | A1 | 8/2012 | Bily et al. |
| 2014/0266946 | A1 * | 9/2014 | Bily ....................... H01Q 3/443 343/771 |
| 2015/0229028 | A1 | 8/2015 | Bily et al. |
| 2016/0359234 | A1 | 12/2016 | Bily et al. |
| 2016/0372834 | A1 | 12/2016 | Bily et al. |
| 2017/0170557 | A1 * | 6/2017 | Shipton .................. C09K 19/18 |

FOREIGN PATENT DOCUMENTS

| | | | | |
|---|---|---|---|---|
| CN | 105693888 | A | 6/2016 | |
| JP | H05-203928 | A | 8/1993 | |
| JP | H10-152672 | A | 6/1998 | |
| JP | 2000-508685 | A | 7/2000 | |
| JP | 2003-147280 | A | 5/2003 | |
| JP | 2003-313216 | A | 11/2003 | |
| JP | 2003313216 | A | * 11/2003 | ............ C08F 299/02 |
| JP | 2005-263987 | A | 9/2005 | |
| JP | 2009-538565 | A | 11/2009 | |
| JP | 2013-539949 | A | 10/2013 | |
| JP | 2016-512408 | A | 4/2016 | |

* cited by examiner

SEALANT COMPOSITION, LIQUID CRYSTAL CELL, AND METHOD OF PRODUCING LIQUID CRYSTAL CELL

TECHNICAL FIELD

The present invention relates to a sealant composition, a liquid crystal cell, and a method of producing the liquid crystal cell.

BACKGROUND ART

Antennas used for mobile communication, satellite broadcasting, and other purposes require a beam scanning function that can change a beam direction. As an antenna having such a function, a scanning antenna utilizing a large dielectric anisotropy (birefringence) of a liquid crystal material (including a nematic liquid crystal and a polymer-dispersed liquid crystal) has been suggested (for example, Patent Documents 1 to 3). This type of scanning antenna has a configuration in which a liquid crystal layer is sandwiched between substrates that include electrodes (i.e., a liquid crystal cell for a scanning antenna).

RELATED ART DOCUMENT

Patent Document

Patent Document 1: Japanese Translation of PCT International Application Publication No. JP-T-2013-539949
Patent Document 2: Japanese Translation of PCT International Application Publication No. JP-T-2016-512408
Patent Document 3: Japanese Translation of PCT International Application Publication No. JP-T-2009-538565

Problem to be Solved by the Invention

A scanning antenna requires a liquid crystal compound that has dielectric anisotropy (As) with a sufficient level in a gigahertz band. Therefore, in practical, a scanning antenna should use a liquid crystal compound that contains an isothiocyanate group with high dielectric anisotropy.

However, the liquid crystal compound that contains the isothiocyanate group is sensitive to light (ultraviolet light, visible light). In a method of producing a liquid crystal cell including a process for adding a liquid crystal material by an one drop fill (ODE) method, light (e.g., ultraviolet light) is applied to a sealant (a sealant composition) formed in a frame shape on a substrate that is not yet bonded to another and before cured is subjected to light. If some rays of the light hit liquid crystal materials (e.g., a liquid crystal compound that contains an isothiocyanate group) inside the sealant in the frame shape, some of the liquid crystal materials may be deteriorated. Light reactant in the liquid crystal compound that contains the isothiocyanate group may cause a significant decrease in voltage holding ratio (VHR) between the substrates in the liquid crystal cell. The decrease in voltage holding ratio may result in malfunction of the scanning antenna.

How impurities that may result in the decrease in voltage holding ratio are generated from the liquid crystal compound that contains the isothiocyanate group in the liquid crystal cell will be described with reference to FIG. 1. FIG. 1 illustrates now impurities that contain stable radicals are generated from the liquid crystal compound that contains the isothiocyanate group. As illustrated in FIG. 1, the liquid crystal compound that contains the isothiocyanate group expressed by chemical formula (a-1) has a structure in which the isothiocyanate group bound to a phenylene group ($-C_6H_4-N=C=S$). The isothiocyanate group readily reacts with moisture ($H_2O$) from the outside of the liquid crystal cell or a functional group with active hydrogen that exists in the surrounding environment (e.g., a carboxyl group, a hydroxyl group). As a result of the reaction, a compound having a thiourethane bond or a compound having another bond ($-C_6H_4-NH-CS-O-$) as expressed by chemical formula (a-2) is formed. Cleavage of such a compound easily occurs when light is applied to the compound (photo-cleavage). As a result, a pair of compounds each including radicals expressed by chemical formulas (a-3) and (a-4) is formed.

The compound expressed by chemical formula (a-3) readily reacts with oxygen. When the compound expressed by chemical formula (a-3) is oxidized, a compound that contains a highly reactive stable radical (expressed by chemical formula (a-5)) is generated. Such a radical is less likely to disappear in a liquid crystal layer and thus an ion component is more likely to be generated in the liquid crystal layer due to the radical, resulting in the decrease in voltage holding ratio of the liquid crystal cell.

In general, the liquid crystal compound that contains the isothiocyanate group has a structure in which multiple phenylene groups are attached to one another. As the number of the phenylene groups increases, light absorption in a long-wavelength region (light with a wavelength equal to or greater than 350 nm or light with a wavelength equal to or greater than 400 nm) is more likely to occur. If tolan groups exist between the phenylene groups, light absorption in a longer-wavelength region (light with a wavelength equal to or greater than 400 nm or light with a wavelength equal to or greater than 420 nm) is more likely to occur. The radical generation due to the cleavage of the compound having the thiourethane bond or the oxidation reaction on the generated radical is more likely to occur.

DISCLOSURE OF THE PRESENT INVENTION

An object of the present invention is to provide a sealant composition that is less likely to cause a decrease in voltage holding ratio in a liquid crystal cell used for a scanning antenna.

Means for Solving the Problem

A sealant composition according to the present invention includes a photo-radical polymerization initiator and polymerization component. The photo-radical polymerization initiator is configured to generate a radical when light with a wavelength of 450 nm or greater is applied. The polymerization component includes a polymerizable functional group polymerizable using the radical.

In the sealant composition, it is preferable that the photo-radical polymerization initiator has a structure selected from camphorquinone-based component, benzyltrimethylbenzoyldiphenylphosphinic oxide, methylthioxanthone, and pentafluorophenyl.

In the sealant composition, it is preferable that the photo-radical polymerization initiator includes a polymerizable functional group polymerizable using the radical.

In the sealant composition, it is preferable that the polymerizable functional group is an acryloyl group or a methacryloyl group.

In the sealant composition, it is preferable that the photo-radical polymerization initiator includes a compound expressed by chemical formula (1):

[C1]

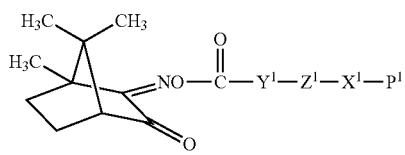
(1)

In chemical formula (1), $P^1$ is an acryloyl group, a methacryloyl group, an acrylamide group, or a methacrylamide group, $X^1$ and $Y^1$ are structures expressed by chemical formulas (2-1) and (2-2), $Z^1$ is O, COO, NHCO, CONH, S, or a direct bond.

[C2]

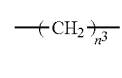
(2-1)

(2-2)

In chemical formula (2-1), $n^3$ is any one of integers of 1 to 18, H may be replaced with a methyl group or a halogen group. In chemical formula (2-2), $n^4$ is any one of integers of 1 to 18, H may be replaced with a methyl group or a halogen group. If either $X^1$ or $Y^1$ is the structure expressed by chemical formula (2-2), $Z^1$ is CO or a direct bond. $X^1$ and $Y^1$ do not become the structure expressed by chemical formula (2-2) at the same time.

In the sealant composition, the polymerizable component may include thermally reactive functional groups. The sealant composition may further include a hardener for establishing cross-linkage between the thermally reactive functional groups.

A liquid crystal cell includes a liquid crystal layer, two substrates, and a sealant. The substrates are opposed to each other with the liquid crystal layer sandwiched between the substrates. The sealant is made of a hardened material including the sealant composition described above. The sealant is disposed between the substrates to surround the liquid crystal layer and bonded to the substrates.

One of the substrates may be a TFT substrate including a first dielectric substrate, TFTs supported by the first dielectric substrate, and patch electrodes electrically connected to the plurality of TFTs. Another one of the substrates may be a slot substrate including a second dielectric substrate and a slot electrode including a plurality of slots. The liquid crystal layer may be disposed between the TFT substrate and the slot substrate that are disposed so that the patch electrodes and the slot electrode are opposed to each other and the slots faces the patch electrodes.

The liquid crystal layer may include a liquid crystal compound that includes an isothiocyanate group.

The liquid crystal compound that includes the isothiocyanate group may include a structure expressed by either one of chemical formulas (3-1) and (3-2):

[C3]

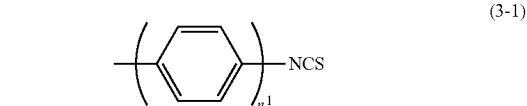
(3-1)

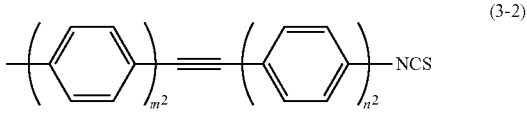
(3-2)

(where $n^1$, $m^2$, and $n^2$ in chemical formulas (3-1) and (3-2) are integers from 1 to 5, and H in the phenylene group may be replaced with F or Cl).

The TFT substrate and/or the slot substrate may include an alignment film disposed on a liquid crystal layer side and made of polyimide-based resin.

A method of producing a liquid crystal cell according to the present invention is for producing the liquid crystal cell described above. The sealant may include the sealant composition that is hardened by applying light with a wavelength of 450 nm or greater to the sealant composition.

A method of producing a liquid crystal cell according to the present invention includes: applying the sealant composition according to any one of claims 1 to 6 to one of a TFT substrate and a slot substrate to form a frame shape, the TFT substrate including a first dielectric substrate, a plurality of TFTs supported by the first dielectric substrate, and a plurality of patch electrodes electrically connected to the plurality of TFTs, the slot substrate including a second dielectric substrate and a slot electrode supported by the second dielectric substrate and including a plurality of slots; applying a liquid crystal material to an area defined by the sealant composition in the frame shape on one of the substrates by an ODF method; applying light with a wavelength of 450 nm to the sealant composition on the one of the substrates so that the sealant composition is temporarily cured; bonding the one of the substrates to another one of the substrates with the sealant composition between the substrates; and curing the sealant composition so that the sealant composition is permanently cured.

In the method of the liquid crystal cell, the liquid crystal material may include a liquid crystal compound that contains an isothiocyanate group.

The liquid crystal compound that contains the isothiocyanate group may nave a structure expressed by one of chemical formulas (3-1) and (3-2).

Advantageous Effect of the Invention

According to the present invention, a sealant composition that is less likely to cause a decrease in voltage holding ratio in a liquid crystal cell used for a scanning antenna is provided.

MODE FOR CARRYING OUT THE INVENTION

First Embodiment

Basic Structure of Scanning Antenna A scanning antenna has a beam scanning function that can change a beam direction. The scanning antenna has a structure that includes antenna units that use a large anisotropy (birefringence) of a dielectric constant M ($\varepsilon_M$) of a liquid crystal material. The scanning antenna controls a voltage applied to a liquid crystal layer of each antenna unit to change an effective dielectric constant M($\varepsilon$M) of the liquid crystal layer of each antenna unit to form, a two-dimensional pattern by the antenna units having different capacitances. Since the dielectric constant of the liquid crystal material has frequency dispersion, a dielectric constant in a frequency band of a microwave is particularly referred to as a "dielectric constant M ($\varepsilon_M$)" in this description.

Electromagnetic waves (e.g., microwaves) exiting from the scanning antenna or received by the scanning antenna are controlled to have phase differences corresponding to capacitances of the antenna units, respectively, so that the electromagnetic waves nave a strong directivity in a specific direction according to the two-dimensional pattern formed by the antenna units having the different capacitances (beam scanning). For example, spherical waves may be obtained by scattering input electromagnetic waves that have entered to the antenna units, respectively. The electromagnetic waves exiting from the scanning antenna may be obtained by integrating the spherical by the respective antenna units in consideration of the phase difference given by the respective antenna units.

Figure 2:
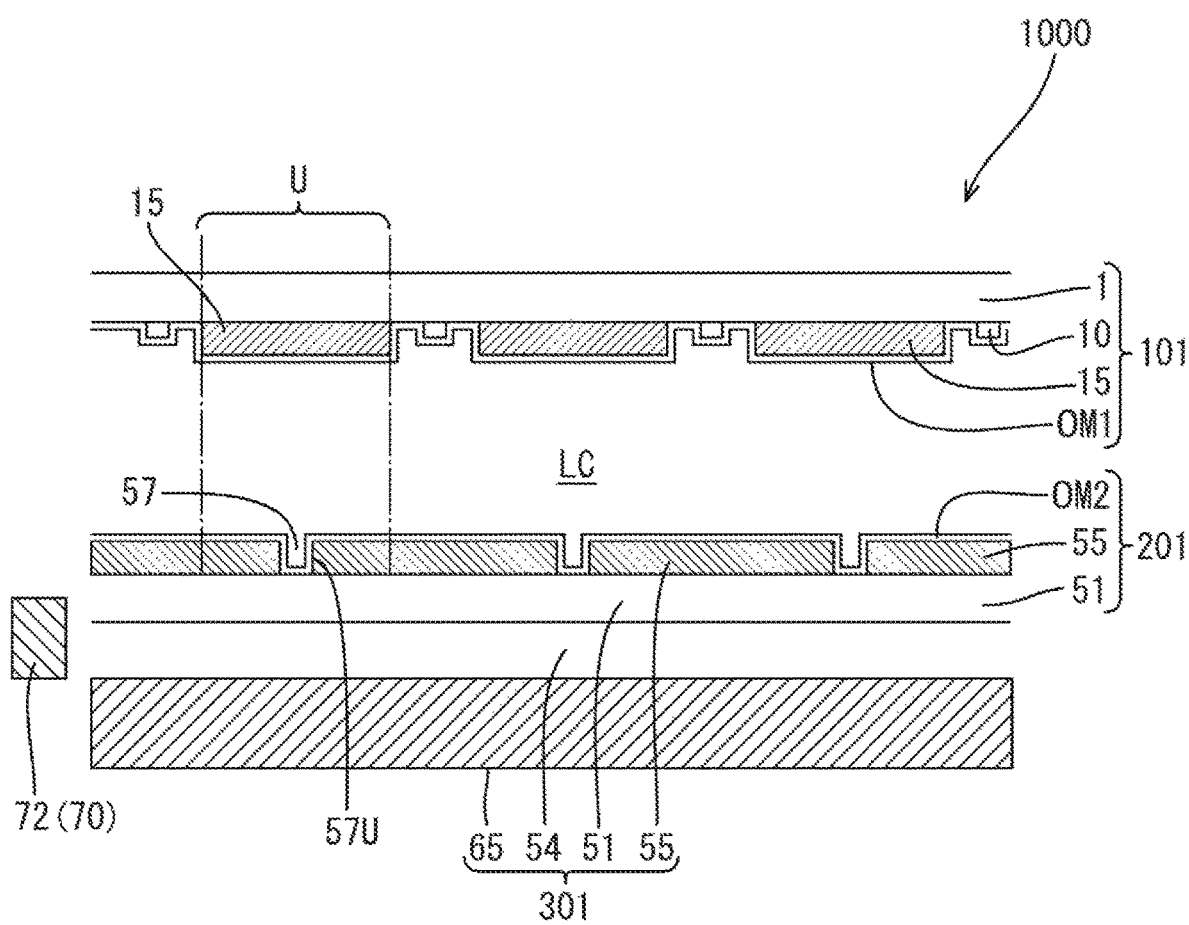
FIG. 2 is a cross-sectional view schematically illustrating a portion of a scanning antenna according to a first embodiment.

A basic structure of a scanning antenna according to the first embodiment of the present invention will be described with reference to at least FIG. 2. FIG. 2 is a cross-sectional view schematically illustrating a portion of a scanning antenna 1000 according to a first embodiment. The scanning antenna 1000 according to this embodiment is a radial line slot antenna. The scanning antenna 1000 includes slots 57 that are concentrically arranged. FIG. 2 illustrates a portion of a cross section taken along a radial direction from a feeding pin 72 that is disposed close to the center of the concentrically arranged slots. Another embodiment may include slots arranged differently from the arrangement of the slots in this embodiment (e.g., a spiral arrangement and a matrix arrangement).

The scanning antenna 1000 includes at least a thin film transistor (TFT) substrate 101, a slot substrate 201, a liquid crystal layer LC that is disposed between the TFT substrate 101 and the slot substrate 201, and a reflective conductive plate 65. The scanning antenna 1000 is configured to transmit and receive microwaves to and from the TFT substrate 101. The TFT substrate 101 and the slot substrate 201 are disposed to face each other and to sandwich the liquid crystal layer LC therebetween.

Figure 1:
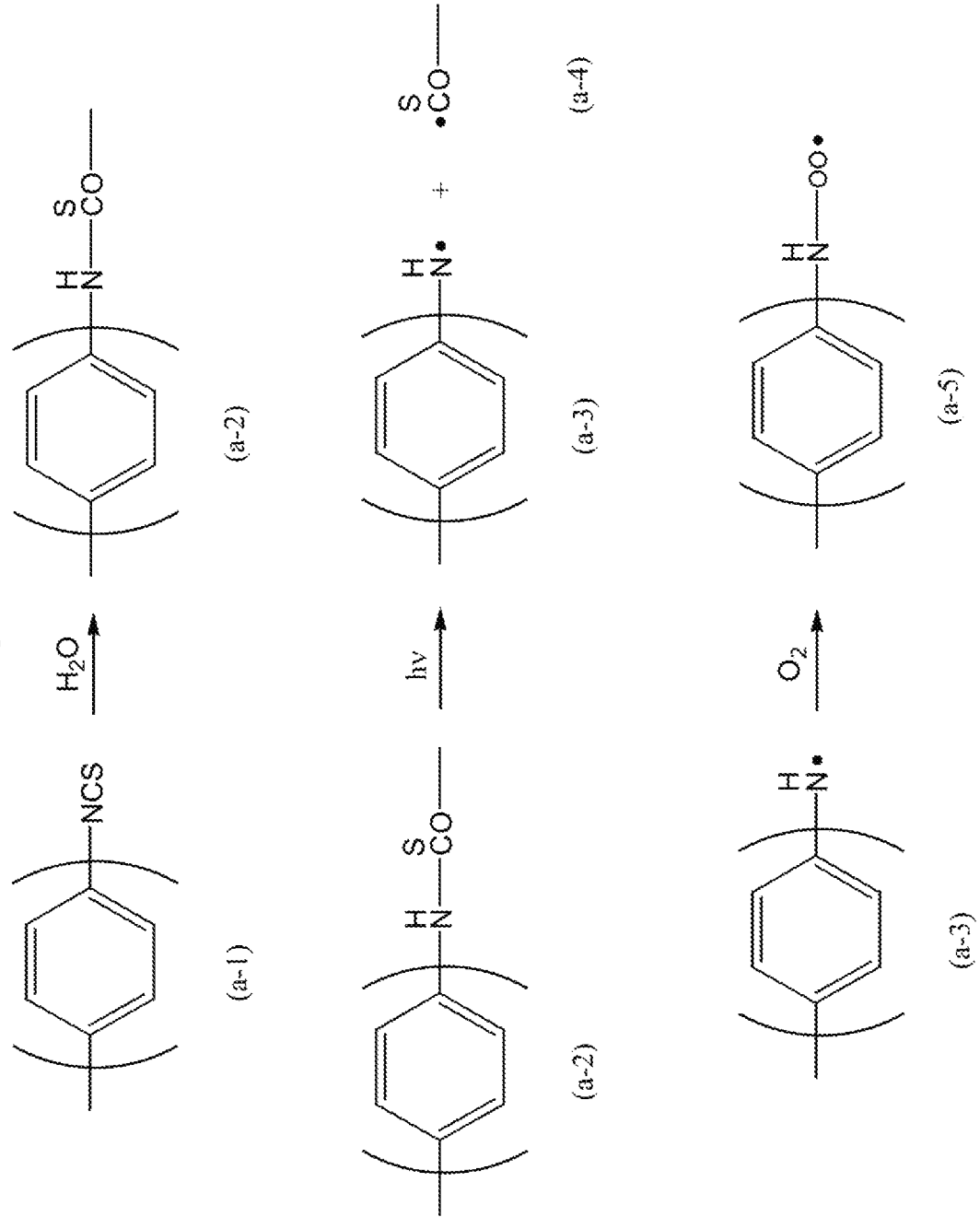
FIG. 1 is an explanatory view illustrating how impurities that contain stable radicals are generated from the liquid crystal compound that contains the isothiocyanate group.

The TFT substrate 101 includes a dielectric substrate (an example of a first dielectric substrate) 1, patch electrodes 15, thin film transistors (TFTs) 10, and an alignment film OM1. The dielectric substrate 1 may be a glass substrate. The patch electrodes 15 and the TFTs 10 are formed on a surface of the dielectric substrate 1 facing the liquid crystal layer LC. The alignment film OM1 is formed on an outermost surface facing the liquid crystal layer LC. Gate bus lines and source bus lines, which are not illustrated in FIG. 1, are connected to the TFTs 10.

The slot substrate 201 includes a dielectric substrate (an example of a second dielectric substrate) 51, a slot electrode 55, and an alignment film OM2. The dielectric substrate 51 may be a glass substrate. The slot electrode 55 is formed on a surface of the dielectric substrate 51 facing the liquid crystal layer LC. The alignment film OM2 is formed on an outermost surface facing the liquid crystal layer LC. The slot electrode 55 includes slots 57.

It is preferable that the dielectric substrates 1 and 51 used in the TFT substrate 101 and the slot substrate 201, respectively, have small dielectric losses against microwaves. Plastic substrates other than the glass substrates may be used for the dielectric substrates 1 and 51. A thickness of each of the dielectric substrates 1 and 51 is not limited; however, the thickness is preferably 400 μm or less, more preferably, 300 μm or less. A lower limit of the thickness of each of the dielectric substrates 1 and 51 is not limited and the thickness may be set at any value as long as each of the dielectric substrates 1 and 51 has sufficient strength not to break in a production process.

The reflective conductive plate 65 is disposed to face the slot substrate 201 with an air layer 54 therebetween. Another embodiment may include a layer made of a dielectric (for example, a fluororesin such as polytetrafluoroethylene (PTFE)) having a small dielectric constant M for microwaves instead of the air layer 54. In the scanning antenna 1000 according to this embodiment, the slot electrode 55, the reflective conductive plate 65, and the dielectric substrate 51 and the air layer 54, which are located between the slot electrode 55 and the reflective conductive plate 65, function as a waveguide 301.

The patch electrode 15, a portion (hereinafter referred to as a "slot electrode unit 57U") of the slot electrode 55 including the slot 57, and the liquid crystal layer LC between the patch electrode 15 and the slot electrode unit 57U constitute an antenna unit U. In each antenna unit U, one island-shaped patch electrode 15 faces one hole-shaped slot 57 (one slot electrode unit 57U) with the liquid crystal layer LC therebetween to form a liquid crystal capacitor. In the scanning antenna 1000 according to this embodiment, antenna units U are concentrically arranged. Each antenna unit U includes an auxiliary capacitor electrically connected in parallel to the liquid crystal capacitor.

The slot electrode 55 constitutes the antenna unit U in each slot electrode unit 57U, and also functions as a wall of the waveguide 301. The slot electrode 55 requires a function for reducing transmission of the microwaves and thus the slot electrode 55 is constructed from a relatively thick metal layer. Examples of such a metal layer include a Cu layer and an Al layer. To reduce a microwave of 10 GHz up to 1/150, a thickness of the Cu layer is set to 3.3 urn or greater and a thickness of the Al layer is set to 4.0 µm or greater. To reduce a microwave of 30 GHz up to 1/150, a thickness of the Cu layer is set to 1.9 µm or greater and a thickness of the Al layer is set to 2.3 µm or greater. An upper limit of a thickness of the metal layer constituting the slot electrode 55 is not particularly limited, but it can be said that it preferable that the thickness of the metal layer be as small as possible in consideration of the formation of the alignment film OM2 as described below. When the Cu layer is provided, as the metal layer, there is an advantage that the Cu layer can be made thinner than the Al layer. As a method, of forming the slot electrode 55, other methods such as a thin film deposition method, used in technology of a liquid crystal display device according to the related, art or a method of attaching a metal foil (for example, a Cu foil or an Al foil) onto a substrate may be used. A thickness of the metal, layer may be set in a range from 2 µm to 30 µm. To form the metal layer by the thin film deposition method, the thickness of the metal layer may be set to 5 µm or less. The reflective conductive plate 65 may be constructed from an aluminum plate, a copper plate or the like having a thickness of several millimeters.

Since the patch electrode 15 does not constitute the waveguide 301 unlike the slot electrode 55, the patch electrode 15 may be constructed from a metal layer having a thickness smaller than that of the slot electrode 55. It is preferable that the patch electrode 15 has a low resistance so that heat that may be generated when the vibrations of the free electrons in the patch electrode 15 are caused by vibrations of free electrons around the slot 57 of the slot electrode 55 is less likely to be generated and thus a loss is less likely to occur. In terms of mass production, it is more preferable to use an Al layer rather than a Cu layer. It is preferable that the Al layer has a thickness in a range from 0.5 µm to 2 µm.

An array pitch of the antenna units U may be set to λ/4 or less and/or equal to λ/5 or less, where λ is a wavelength of the microwave, as described in Patent Document 1. When the wavelength λ may be 25 mm, the array pitch may be set to 6.25 mm or less and/or 5 mm or less.

The scanning antenna 1000 changes phases of microwaves excited (re-radiated) by changing a capacitance of the liquid crystal capacitor of the antenna unit U and exiting from each patch electrode 15. In a liquid crystal layer LC, it is preferable that anisotropy (ΔεM) of a dielectric constant M(εM) relative to the microwave is larger and tan δm (dielectric loss tangent for the microwave) is smaller. For example, ΔεM is 4 or greater and tan δM is 0.02 or less (both of them are values of 19 GHz) as in SID 2015 DIGEST pp. 824 to 826 written by M. Wittek et al. may be preferable. Other than that, a liquid crystal material having ΔεM of 0.4 or greater and tan δM of 0.04 or less as in Polymer 55 vol. August, pp. 599 to 602 (2006) written by Kuki may be used.

Although the dielectric constant of the liquid crystal material generally has frequency dispersion, the dielectric anisotropy ΔεM relative to the microwave has a positive correlation with refractive index anisotropy Δn relative to visible light. A material having a large refractive index anisotropy Δn relative to the visible light is preferable for a liquid crystal material for the antenna unit for the microwave. When Δn (birefringence) for 550-nm light is used as an index, a nematic liquid crystal having Δn of 0.3 or greater, preferably, 0.4 or greater is used for the antenna unit for the microwave. An upper limit of Δn is not limited. A thickness of the liquid crystal layer LC may be set in a range from 1 µm to 500 µm.

Figure 3:
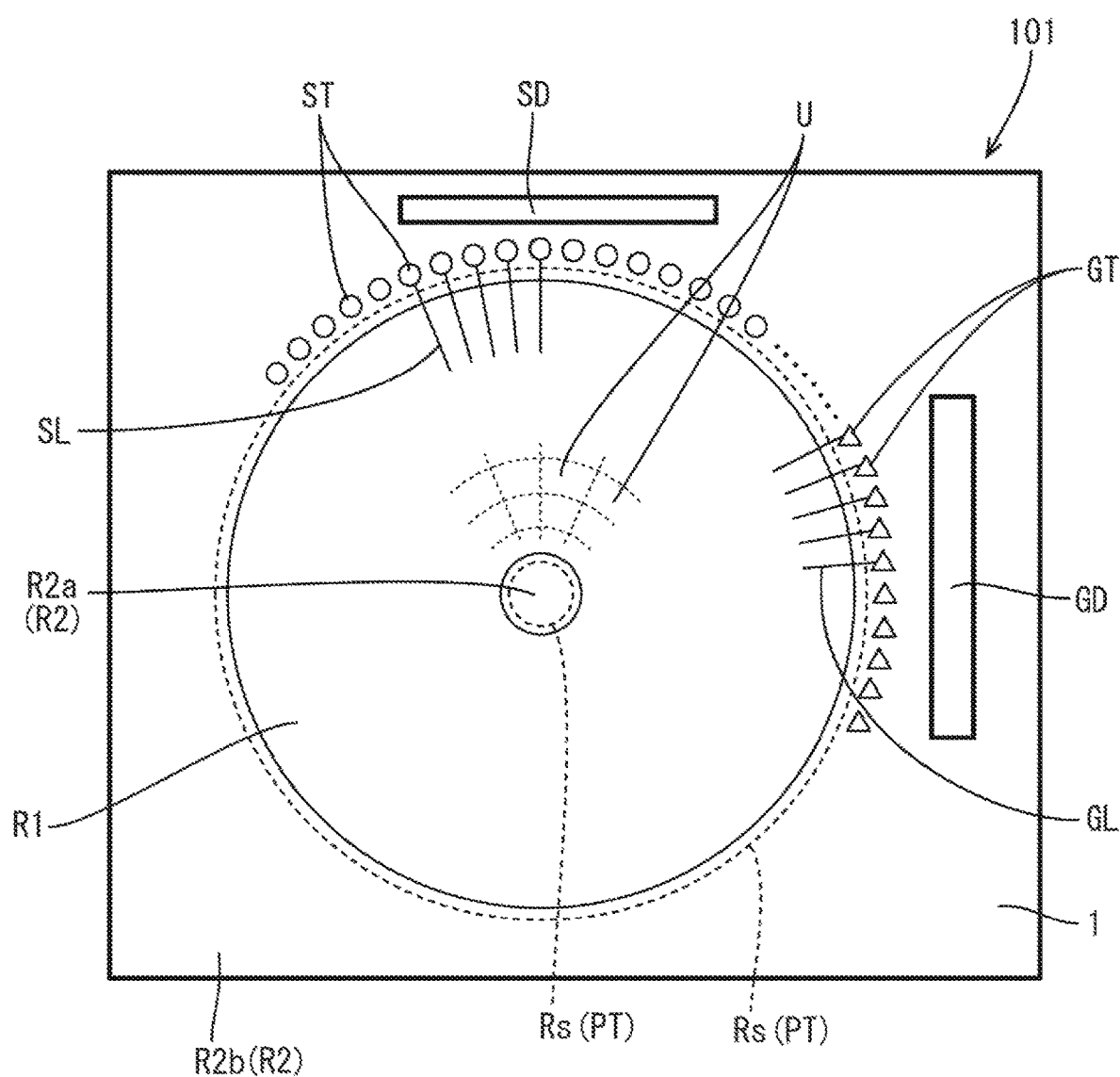
FIG. 3 is a plan view schematically illustrating a TFT substrate included in the scanning antenna.
Figure 4:
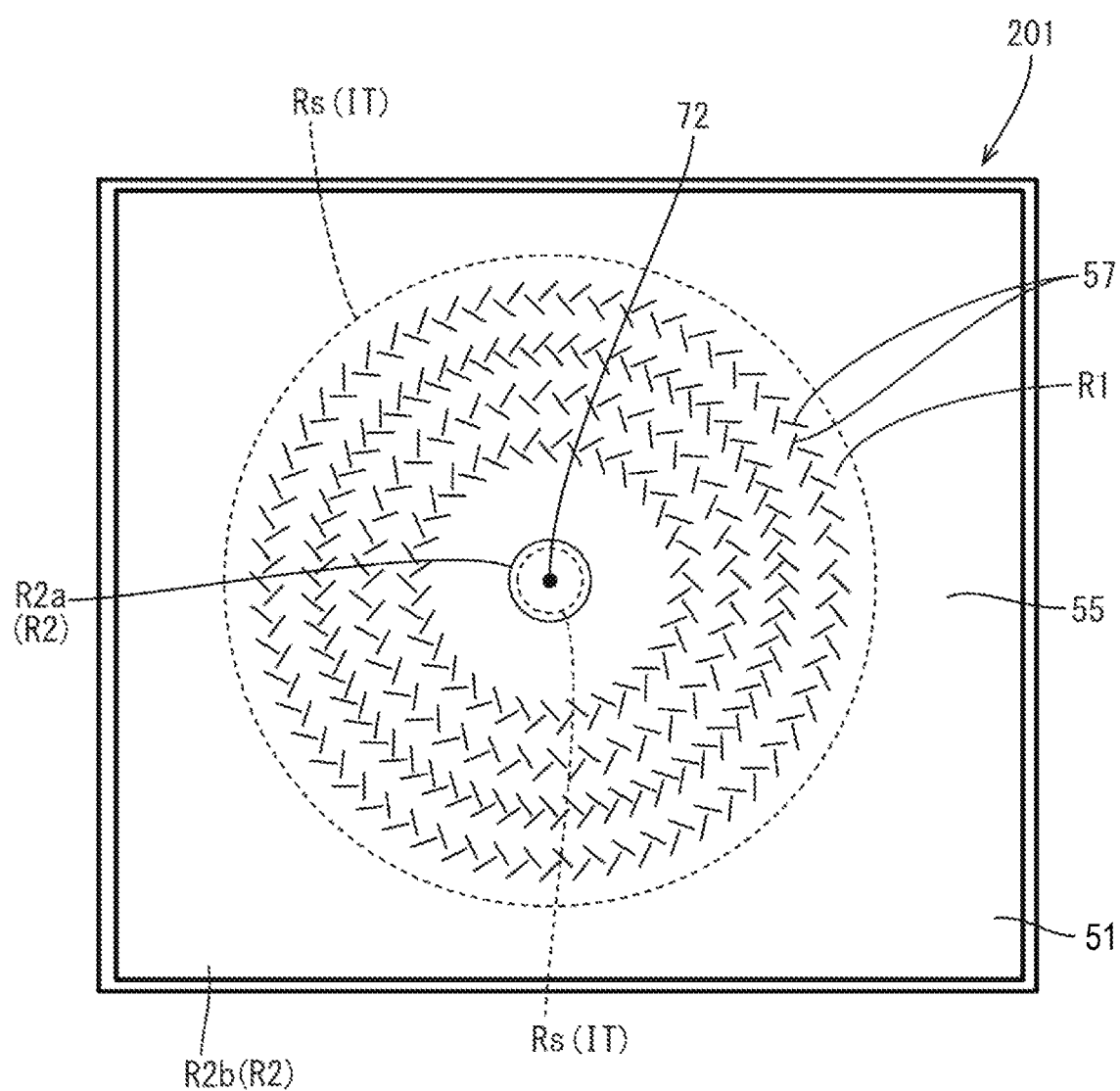
FIG. 4 is a plan view schematically illustrating a slot substrate included in the scanning antenna.

FIG. 3 is a plan view schematically illustrating the TFT substrate 101 included in the scanning antenna 1000. FIG. 3 is a plan view schematically illustrating the slot substrate 201 included in the scanning antenna 1000. Regions of the TFT substrate 101 and regions of the slot substrate 201 that correspond to the antenna units U are referred to as "antenna unit regions," respectively, for convenience of explanation and the same reference symbols as that of the antenna units are used as reference symbols of the antenna unit regions. As illustrated in FIGS. 3 and 4, in the TFT substrate 101 and the slot substrate 201, a region defined by the antenna unit regions U that are two-dimensionally arranged is referred to as a "transmission/reception region R1." A region other than the transmission/reception region R1 is referred to as a "non-transmission/reception region R2." In the non-transmission/reception region R2, a terminal, and a drive circuit are arranged.

The transmission/reception region R1 has a ring shape when viewed in plan. The non-transmission/reception region R2 includes a first non-transmission/reception region R2a corresponding to a central area of the transmission/reception region R1 and a second non-transmission/reception region R2b corresponding to a circumferential area of the transmission/reception region R1. An outer diameter of the transmission/reception region R1 may be in a range from 200 mm to 1,500 mm. The outer diameter may be set according to a volume of communication where appropriate.

Gate bus lines GL and source bus lines SL supported by the dielectric substrate 1 are disposed on the transmission/reception region R1 of the TFT substrate 101. Driving of each antenna unit region U is controlled by using these lines. Each antenna unit region U includes the corresponding TFT 10 and the corresponding patch electrode 15 electrically connected to the TFT 10. A source electrode of the TFT 10 is electrically connected to a source bus line SL. A gate electrode of the TFT 10 is electrically connected to a gate bus line GL. A drain electrode of the TFT 10 is electrically connected to the patch electrode 15.

In the non-transmission/reception region R2 (the first non-transmission/reception region R2a and the second non-transmission/reception region R2b), seal regions Rs including sealants (not illustrated) to surround the transmission/reception region R1 are arranged. The sealants fix the TFT substrate 101 and the slot substrate 201 to each other and seal the liquid crystal material (the liquid crystal layer LC) between the TFT substrate 101 and the slot substrate 201. The sealants will be described in detail later.

Gate terminals GT, a gate driver GD, source terminals ST, and a source driver SD are disposed outside the seal region Rs of the non-transmission/reception region R2. The gate bus lines GL are connected to the gate driver GD through the gate terminals GT. The source bus lines SL are connected to the source driver SD through the source terminals ST. The source driver SD and the gate driver GD are disposed on the dielectric substrate 1 of the TFT substrate 101 in this embodiment; however, one or both of the source driver SD and the gate driver GD may also be disposed on the dielectric substrate 51 of the slot substrate 201.

Transfer terminals PT are disposed in the non-transmission/reception region R2. The transfer terminals PT are electrically connected to the slot electrode 55 of the slot substrate 201. In this embodiment, the transfer terminals PT are disposed in the first non-transmission/reception region R2a and the second non-transmission/reception region R2b.

Another embodiment may include transfer terminals PT disposed in only any one of the first non-transmission/reception region R2a and the second non-transmission/reception region R2b. In this embodiment, the transfer terminals PT are disposed in the seal regions Rs. A conductive resin that contains conductive particles (conductive beads) is used for the sealants.

As illustrated in FIG. 4, the slot substrate 201 includes the slot electrode 55 is disposed on the dielectric substrate 51 to cover the transmission/reception region R1 and the non-transmission/reception region R2. FIG. 4 illustrates a surface of the slot substrate 201 viewed from the liquid crystal layer LC. For convenience of explanation, the alignment film OM2 formed on the outermost surface is not illustrated.

slots 57 are formed in the slot electrode 55 in the transmission/reception region R1 of the slot substrate 201. The slots 57 are provided in the antenna unit regions U of the TFT substrate 101, respectively. In this embodiment, the slots 57 are provided in pairs each extending in directions substantially perpendicular to each other. The pairs of the slots 57 are concentrically arranged to constitute the radial line slot antenna. Since the scanning antenna 1000 has such pairs of slots 57, the scanning antenna 1000 can transmit and receive circularly polarized waves.

Terminals IT of the slot electrode 55 are disposed in the non-transmission/reception region R2 of the slot substrate 201. The terminals IT are electrically connected to the transfer terminals PT of the TFT substrate 101. In this embodiment, the terminals IT disposed in the seal regions Rs are electrically connected to the corresponding transfer terminals PT via the sealants made of the conductive resin that contains the conductive particles (conductive beads) as described earlier.

In the first non-transmission/reception region R2a, the feeding pin 72 is disposed at the center of a concentric circle formed by the slots 57. With the feeding pin 72, the microwaves are supplied to the waveguide 301 constituted by the slot electrode 55, the reflective conductive plate 65, and the dielectric substrate 51. The feeding pin 72 is connected to a feeding device 70. Any one of a direct-coupling feeding method and an electromagnetic coupling feeding method may be used for the feeding. A known feeding structure may be used.

The TFT substrate 101, the slot substrate 201, and the waveguide 301 will be described in detail.

Figure 5:
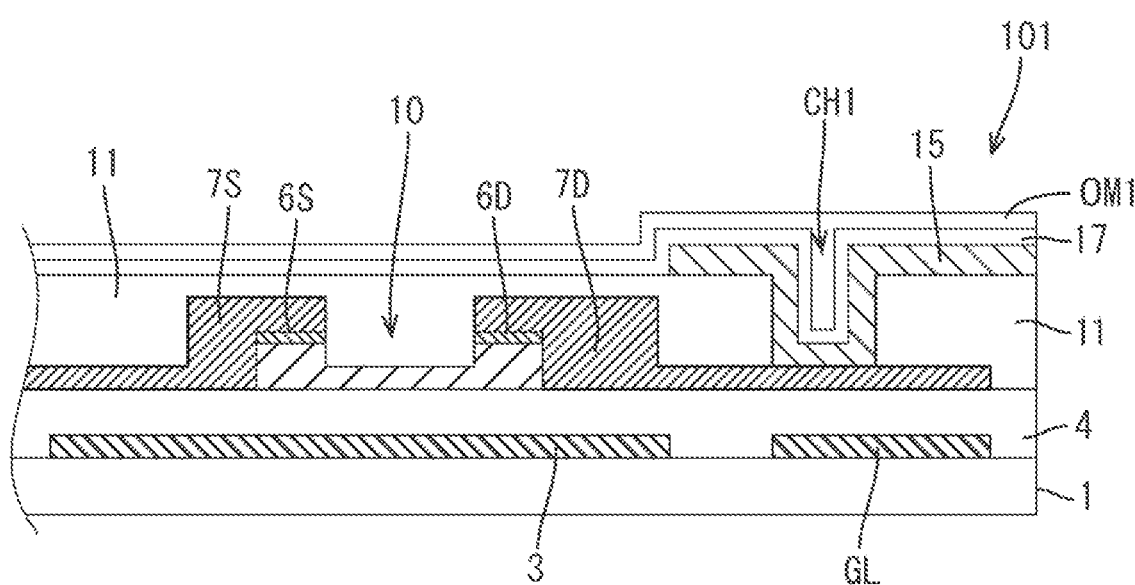
FIG. 5 is a cross-sectional view schematically illustrating an antenna unit region of the TFT substrate.
Figure 6:
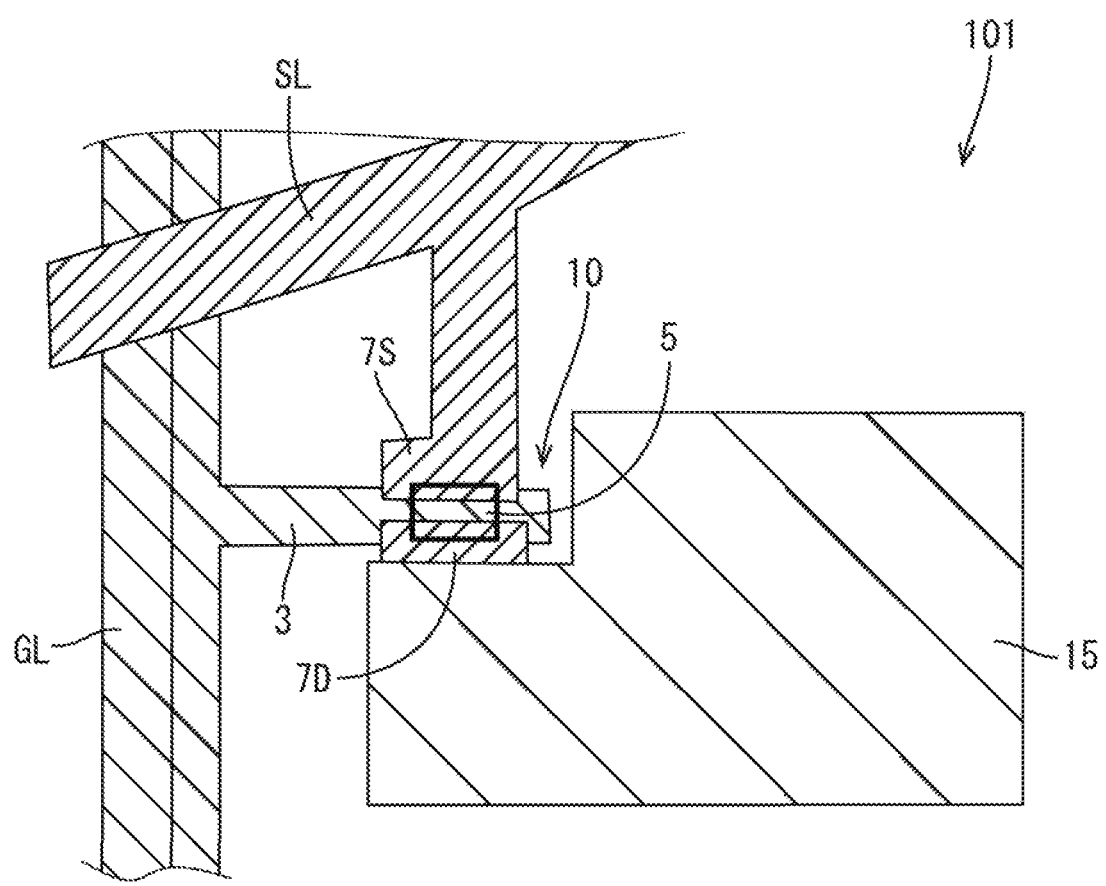
FIG. 6 is a plan view schematically illustrating the antenna unit region of the TFT substrate.

Structure of TFT Substrate 101 FIG. 5 is a cross-sectional view schematically illustrating the antenna unit region U of the TFT substrate 101. FIG. 6 is a plan view schematically illustrating the antenna unit region U of the TFT substrate 101. In FIGS. 5 and 6, cross-sectional configurations of portions in the transmission/reception region R1 are illustrated.

In each antenna unit region U of the TFT substrate 101, the dielectric substrate (first dielectric substrate) 1, the TFT 10, a first insulating layer 11, the patch electrode 15, a second insulating layer 17, and the alignment film OM1 are disposed. The TFT 10 is supported by the dielectric substrate 1. The first insulating layer 11 covers the TFT 10. The patch electrode 15 is disposed on the first insulating layer 11 and electrically connected to the TFT 10. The second insulating layer 17 covers the patch electrode 15. The alignment film OM1 covers the second insulating layer 17.

The TFT 10 includes a gate electrode 3, a semiconductor layer 5 having an island shape, a gate insulating layer 4 disposed between the gate electrode 3 and the semiconductor layer 5, a source electrode 7S, and a drain electrode 7D. The TFT 10 in this embodiment is a channel etch type TFT having a bottom gate structure. Another embodiment may include TFTs having other structures.

The gate electrode 3 is electrically connected to the gate bus line GL and configured to receive scanning signals from the gate bus line GL. The source electrode 7S is electrically connected to the source bus line SL and configured to receive data signals from the source bus line SL. The gate electrode 3 and the gate bus line GL may be constructed from the same conductive film (gate conductive film). The source electrode 7S, the drain electrode 7D, and the source bus line SL may be constructed from the same conductive film (source conductive film). The gate conductive film and the source conductive film may be metal films. A layer constructed from the gate conductive film may be referred to as a "gate metal layer" and a layer constructed from the source conductive film may be referred to as a "source metal layer."

The semiconductor layer 5 is disposed to overlap the gate electrode 3 with the gate insulating layer 4 disposed between the gate electrode and the semiconductor layer 5. As illustrated in FIG. 5, a source contact layer 6S and a drain contact layer 6D are disposed on the semiconductor layer 5. The source contact layer 6S and the drain contact layer 6D are disposed at sides of a region (channel region) in which a channel is formed in the semiconductor layer 5, respectively. The source contact layer 6S and the drain contact layer 6D face each other. In this embodiment, the semiconductor layer 5 is an intrinsic amorphous silicon (i-a-Si) layer and the source contact layer 6S and the drain contact layer 6D are $n^+$-type amorphous silicon ($n^+$-a-Si) layers. The semiconductor layer 5 may be constructed from a polysilicon layer or an oxide semiconductor layer in another embodiment.

The source electrode 7S is disposed to contact the source contact layer 6S and connected to the semiconductor layer 5 via the source contact layer 6S. The drain electrode 7D is disposed to contact the drain contact layer 6D and connected to the semiconductor layer 5 via the drain contact layer 6D.

The first insulating layer 11 includes a contact hole CH1 that extends to the drain electrode 7D of the TFT 10.

The patch electrode 15 is disposed on the first insulating layer 11 and in the contact hole CH1 to contact the drain electrode 7D in the contact hole CH1. The patch electrode 15 is constructed at least from a metal layer. The patch electrode 15 may be a metal electrode constructed only from a metal layer. A material of the patch electrode 15 may be the same as that of the source electrode 7S and the drain electrode 7D. A thickness of the metal layer in the patch electrode 15 (a thickness of the paten electrode 15 if the patch electrode 15 is the metal electrode) may be the same as that of the source electrode 7S and the drain electrode 7D. It is preferable that the thickness is greater than that of the source electrode 7S and the drain electrode 7D. With the greater thickness, transmittance of the electromagnetic wave through the patch electrode 15 is maintained lower resulting in a reduction of a sheet resistance of the patch electrode. Therefore, heat that may be generated when the vibrations of the free electrons in the patch electrode occur is less likely to be generated and thus a loss is less likely to occur.

A CS bus line CL may be constructed from the same conductive film as that of the gate bus line GL. The CS bus line CL may be disposed to overlap the drain electrode 7D (or an extending portion of the drain electrode 7D) with the gate insulating layer 4 disposed between the drain electrode 7D and the CS bus line CL to constitute an auxiliary capacitor CS including the gate insulating layer 4 as a dielectric layer.

In this embodiment, the patch electrode 15 is disposed in a layer different from the source metal layer. A thickness of the source metal layer and a thickness of the patch electrode 15 can be independently defined.

The patch electrode 15 may include a Cu layer or an Al layer as a main layer. Performance of the scanning antenna is correlated with an electric resistance of the patch electrode 15. A thickness of the main layer of the patch electrode 15 is set to obtain a designed resistance. It is preferable that the patch electrode 15 have a resistance that is sufficiently low for not hindering vibrations of electrons. If the metal layer in the patch electrode 15 is an Al layer, the thickness of the metal layer in the patch electrode 15 may be set equal to 0.5 μm or greater.

The alignment film OM1 is made of a polyimide-based resin. The alignment film OM1 will be described in detail later.

The TFT substrate 101 is produced by a method described below, for example. First, the dielectric substrate 1 is prepared. A glass substrate or a plastic substrate having heat resistance may be provided as the dielectric substrate 1. The gate metal layer including the gate electrode 3 and the gate bus line GL is disposed on such a dielectric substrate 1.

The gate electrode 3 may be formed integrally with the gate bus line GL. The gate conductive film (with a thickness in a range from 50 nm to 500 nm) is formed on the dielectric substrate 1 by a sputtering method. Then, the gate electrode 3 and the gate bus line GL are formed by patterning the gate conductive film. A material of the gate conductive film is not limited; however, a film including aluminum (Al), tungsten (W), molybdenum (Mo), tantalum (Ta), chromium (Cr), titanium (Ti), or copper (Cu) may be used where appropriate. Alternatively, a film including an alloy or a nitride containing at least one of the metals listed above may be used where appropriate. In this embodiment, a laminated film including a MoN layer (with a thickness of 50 nm), an Al layer (with a thickness of 200 nm), and a MoN layer (with a thickness of 50 nm) disposed in this sequence may be provided as the gate conductive film.

Then, the gate insulating layer 4 is formed to cover the gate metal layer. The gate insulating layer 4 may be formed by a chemical vapor deposition (CVD) method. A silicon oxide ($SiO_2$) layer, a silicon nitride (SiNx) layer, a silicon oxynitride (SiOxNy; x>y) layer, or a silicon nitride oxide; (SiNxOy; x>y) layer may be provided as the gate insulating layer 4 where appropriate. In this embodiment, the gate insulating layer 4 may nave a laminated structure. A SiNx layer (with a thickness of 410 nm) may be formed as the gate insulating layer 4.

Then, the semiconductor layer 5 and a contact layer are formed on the gate insulating layer 4. In this embodiment, an intrinsic amorphous silicon film (with a thickness of 125 nm) and an $n^+$-type amorphous silicon film (with a thickness of 65 nm) are formed in this sequence and patterned to obtain island shaped semiconductor layer 5 and contact layer. A semiconductor film used for the semiconductor layer 5 is not limited to the amorphous silicon film. For example, an oxide semiconductor layer may be provided as the semiconductor layer 5. In this case, a contact layer may not be required between the semiconductor layer 5 and the source and drain electrodes.

Then, the source conductive film (with a thickness in a range from 50 nm to 500 nm) is formed on the gate insulating layer 4 and the contact layer and patterned to obtain the source metal layer that includes the source electrode 7S, the drain electrode 7D, and the source bus line SL. In the forming process, the contact layer is etched. As a result, the source contact layer 6S and the drain contact layer 6D separated from each other are formed.

A material of the source conductive film is not limited; however, a film including aluminum (Al), tungsten (W), molybdenum (Mo), tantalum (Ta), chromium (Cr), titanium (Ti), or copper (Cu) may be used where appropriate. Alternatively, a film including an alloy or a nitride containing at least the metals listed above may be used where appropriate. In this embodiment, a laminated film including a MoN layer (with a thickness of 30 nm), an Al layer (with a thickness of 200 nm), and a MoN layer (with a thickness of 50 nm) disposed in this sequence may be provided as the source conductive film.

In this embodiment, the source conductive film may be formed by a sputtering method and patterned by wet etching (source/drain separation). Then, a portion of the contact layer located above a region to be the channel region of the semiconductor layer 5 may be removed by dry etching to form a gap so that the contact layer is divided into the source contact layer 6S and the drain contact layer 6D. In this process, a surface of the semiconductor layer 5 in the gap is also etched (overetching).

Then, the first insulating layer 11 is formed to cover the TFT 10. In this embodiment, the first insulating layer 11 is disposed to contact the channel region of the semiconductor layer 5. The contact hole CH1 is formed in the first insulating layer 11 to extend to the drain electrode 7D by a known photolithography technology.

The first insulating layer 11 may be an inorganic insulating layer constructed from a silicon oxide ($SiO_2$) film, a silicon nitride (SiNx) film, a silicon oxynitride (SiOxNy; x>y) film, or a silicon nitride oxide (SiNxOy; x>y) film. In this embodiment, a SiNx layer having a thickness of 330 nm may be formed by a CVD method for the first insulating layer 11.

Then, a patch conductive film is formed on the first insulating layer 11 and in the contact hole CH1 and then the patch conductive film is patterned. As a result, the patch electrode 15 is formed in the transmission/reception region R1. A patch connection portion constructed from the same conductive film (a conductive film for patch) as that of the patch electrode 15 is formed in the non-transmission/reception region R2. The patch electrode 15 contacts the drain electrode 7D within the contact hole CH1.

The same material as that of the gate conductive film or the source conductive film may be used for a material of the patch conductive film. However, it is preferable that the patch conductive film have a thickness greater than the thickness of the gate conductive film and the source conductive film. A preferable thickness of the patch conductive film may be in a range from 1 μm to 30 μm. If the thickness of the patch conductive film is less than 1 μm, transmittance of the electromagnetic wave may be about 30% and a sheet resistance becomes 0.03 Ω/sq or greater. The loss is more likely to increase. If the thickness of the patch conductive film is greater than 30 μm, patterning of the slot 57 may become more difficult.

In this embodiment, a laminated film (MoN/Al/MoN) including a MoN layer (with a thickness of 50 nm), an Al layer (with a thickness of 1000 nm), and a MoN layer (with a thickness of 50 run) disposed in this sequence is provided as the patch conductive film.

Then, the second insulating layer (with a thickness in a range from 100 nm to 300 nm) 17 is formed on the patch electrode 15 and the first insulating layer 11. The second insulating layer 17 may be, but not limited to, a silicon oxide ($SiO_2$) film, a silicon nitride (SiNx) film, a silicon oxynitride (SiOxNy; x>y) film, or a silicon nitride oxide (SiNxOy; x>y) film. In this embodiment, a SiNx layer having a thickness of 200 nm may be provided as the second insulating layer 17.

Then, an inorganic insulating film (the second insulating layer 17, the first insulating layer 11, and the gate insulating layer 4) may be collectively etched by dry etching using a fluorine-based gas. In the etching, the patch electrode 15, the source bus line SL, and the gate bus line GL function as an etch stop. A second contact hole is formed in the second insulating layer 17, the first insulating layer 11, and the gate insulating layer 4 to extend to the gate bus line GL. A third contact hole is formed in the second insulating layer 17 and the first insulating layer 11 to extend to the source bus line SL. A fourth contact hole is formed in the second insulating layer 17 to extend to the patch connection portion described earlier.

Then, a conductive film (with a thickness in a range from 50 nm to 200 nm) may be formed on the second insulating layer 17 and in the second contact hole, the third contact hole, and the fourth contact hole by a sputtering method. A transparent conductive film such as an indium tin oxide (ITO) film, an IZO film, or a ZnO film (zinc oxide film) may be provided as the conductive film. In this embodiment, an ITO film having a thickness of 100 nm is provided as the conductive film.

Then, the transparent conductive film is patterned to form an upper connection portion for a gate terminal, an upper-connection portion for a source terminal, and an upper connection portion for a transfer terminal. The upper connection portion for a gate terminal, the upper connection portion for a source terminal, and the upper connection portion for a transfer terminal are provided to protect the electrodes or lines exposed at the terminals. Through this process, the gate terminal GT, the source terminal ST, and the transfer terminal PT are prepared.

Then, the alignment film OM1 is formed to cover at least the second insulating layer 17. The alignment film OM1 will be described in detail later. Through this process, the TFT substrate 101 is prepared.

Structure of Slot Substrate 201

Figure 7:
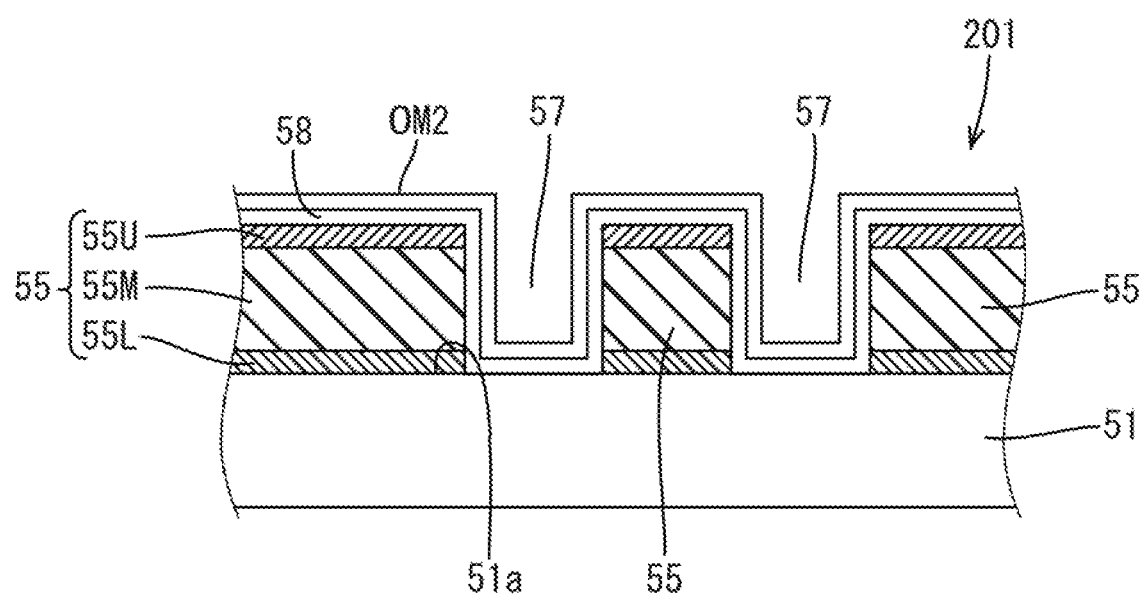
FIG. 7 is a cross-sectional view schematically illustrating am antenna unit region of the slot substrate.

Next, a structure of the slot substrate 201 will be described in more detail. FIG. 7 is a cross-sectional view schematically illustrating the antenna unit region U of the slot substrate 201.

The slot substrate 201 includes at least the dielectric substrate (a second dielectric substrate) 51, the slot electrode 55, a third insulating layer 58, and the alignment film OM2. The slot electrode 55 is formed on one of the plate surfaces (a plate surface facing the liquid crystal layer or a plate surface facing the TFT substrate 101) 51a of the dielectric substrate 51. The third insulating layer 58 covers the slot electrode 55. The alignment film OM2 covers the third insulating layer 58.

In the transmission/reception region R1 of the slot substrate 201, the slots 57 are formed in the slot electrode 55 (see FIG. 3). The slots 57 are through holes (grooves) in the slot electrode 55. In this embodiment, the slots 57 are provided in the antenna unit regions U, respectively.

The slot electrode 55 includes a main layer 55M such as a Cu layer or an Al layer. The slot electrode 55 may have a laminated structure that includes the main layer 55M, an upper layer 55U, and a lower layer 55L. The main layer 55M may be sandwiched between the upper layer 55U and the lower layer 55L. A thickness of the main layer 55M may be set in consideration of a skin effect depending on a material. The thickness may be set in a range from 2 µm to 30 µm. The thickness of the main layer 55M is typically set to be greater than the thicknesses of the upper layer 55U and the lower layer 55L.

In this embodiment, the main layer 55M is a Cu layer. The upper layer 55U and the lower layer 55L are Ti layers. With the lower layer 55L disposed between the main layer 55M and the dielectric substrate 51, adhesion between the slot electrode 55 and the dielectric substrate 51 can be improved. With the upper layer 55U, corrosion of the main layer 55M (for example, the Cu layer) can be suppressed.

The third insulating layer 58 is formed on the slot electrode 55 and in the slot 57. A material of the third insulating layer 52 may be, but not limited to, a silicon oxide ($SiO_2$) film, a silicon nitride (SiNx) film, a silicon oxynitride (SiOxNy; x>y) film, or a silicon nitride oxide (SiNxOy; x>y) film.

The alignment film OM2 is made of polyimide-based resin, similar to the alignment film OM1 of the TFT substrate 101. The alignment film OM2 will be described in detail below.

The terminals IT are disposed in the non-transmission/reception region R2 of the slot substrate 201 (see FIG. 4). Each of the terminals IT includes a portion of the slot electrode 55, the third insulating layer 58 that covers the portion of the slot electrode 55, and an upper connection portion. The third insulating layer 58 includes an opening (a contact hole) which extends to the portion of the slot electrode 55. The upper connection portion contacts the portion of the slot electrode 55 via the opening. In this embodiment, the terminal IT is constructed from a conductive layer such as an ITO film and an IZO film. The terminal IT is disposed in the seal region Rs and is connected to the transfer terminal PT in the TFT substrate 101 via a seal resin containing conductive particles (e.g., conductive beads including Au beads).

The slot substrate 201 may be produced by a method described below. First, the dielectric substrate 51 is prepared. A substrate having a high transmittance (a small dielectric constant εM and a small dielectric loss tan δM) for the electromagnetic wave such as a glass substrate and a resin substrate may be used for the dielectric substrate 51. To suppress attenuation of the electromagnetic wave, it is preferable that the thickness of the dielectric substrate 51 is smaller. For example, after components including the slot electrode 55 are formed on a surface of the glass substrate by a process described below, a back portion of the glass substrate may be removed to reduce the thickness of the glass substrate. The thickness of the glass substrate may be set to 500 µm or less. In general, a resin has a smaller dielectric constant εM and dielectric loss tan δM than those of a glass. When the dielectric substrate 51 is made of resin, the thickness of the dielectric substrate 51 may be set in a range from 3 µm to 300 µm. Polyimide may be used for the resin.

The slot electrode 55 including the slots 57 is prepared by forming a metal film on the dielectric substrate 51 and patterning the metal film. A Cu film (or an Al film) having a thickness in a range from 2 µm to 5 µm may be used for the metal film. A laminated film including a Ti film, a Cu film, and a Ti film that are laminated in this sequence may be used in this embodiment.

Then, the third insulating layer (with a thickness in a range from 100 nm to 200 nm) 58 is formed on the slot electrode 55 and in the slot 57. The third insulating layer 52 is constructed from a silicon oxide ($SiO_2$) film.

Then, in the non-transmission/reception region R2, the opening (the contact hole) is formed in the third insulating-layer 58 to extend to the portion of the slot electrode 55.

Then, a transparent conductive film is formed on the third insulating layer 58 and in the opening of the third insulating layer 58. The transparent conductive film is patterned to form the upper connection portion to contact the portion of the slot electrode 55 and a terminal IT for establishing connection with the transfer terminal PT of the TFT substrate 101.

Then, the alignment film OM2 is formed to cover the third insulating layer 58. The alignment film OM2 will be described in detail later. Through the process described above, the slot substrate 201 is prepared.

Configuration of Waveguide 301

The waveguide 301 is defined by the reflective conductive plate 65, the slot electrode 55, and the dielectric substrate 51 that is disposed between the slot electrode 55 and the reflective conductive plate 65 that faces the slot electrode 55. The reflective conductive plate 65 is disposed to face a back surface of the dielectric substrate 51 via the air layer 54. The reflective conductive plate 65 defines a wall of the waveguide 301. It is preferable that the reflective conductive plate 65 has a thickness of at least three times of the skin depth, preferably, at least five times of the skin depth. An aluminum plate or a copper plate produced by cutting to have a thickness of several millimeters may be used for the reflective conductive plate 65.

The microwaves are supplied to the scanning antenna 1000 via the feeding pin 72 disposed at the center of the antenna units U that are concentrically arranged. While the scanning antenna 1000 is in output operation, the waveguide 301 guides the microwaves outward to radially spread. The microwaves traveling along the waveguide 301 are cut off at each slot 57 of each antenna unit U. According to the principle of a slot antenna, an electric field is generated. With action of the electric field, electric charges are induced in the slot electrode 55 (i.e., the microwaves are converted into vibrations of free electrons in the slot electrode 55). In each antenna unit U, a phase of vibrations of free electrons induced in the patch electrode 15 is controlled by changing a capacitance value of a liquid crystal capacitor through alignment control of liquid crystal molecules. When the electric charges are induced in the patch electrode 15, the electric field is generated (i.e., the vibrations of the free electrons in the slot electrode 55 cause the vibrations of the free electrons in the patch electrode 15). Microwaves (radio waves) are output from the patch electrode 15 of each antenna unit U to travel toward an outer side of the TFT substrate 101. An azimuth angle of a beam is controlled by combining the microwaves (the radio waves) in different phases output from the respective antenna units U.

The waveguide may have a two-tier structure including an upper tier and a lower tier. According to the structure, the microwaves supplied via the feeding pin first travel in the lower tier to radially spread from the center to an outer side. Then, the microwaves are guided by an outer wall of the lower tier toward the upper tier to travel in the upper tier from an outer side to the center. With the two-layer structure, the microwaves are more likely to uniformly spread in the antenna units U.

Alignment Films OM (OM1, OM2)

The alignment films OM1 and OM2 (which may be referred to as an "alignment film OM") included in the TFT substrate 101 and the slot substrate 201 in this embodiment may be prepared by iridizing polyamic acid expressed by chemical formula (4) to obtain a polymer expressed by chemical formula (5) and performing alignment processing such as rubbing on the polymer. The alignment film OM on which the alignment processing is performed has a function for orientating molecules in a liquid crystal compound.

[C4]

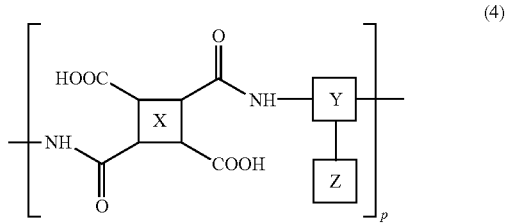

(4)

[C5]

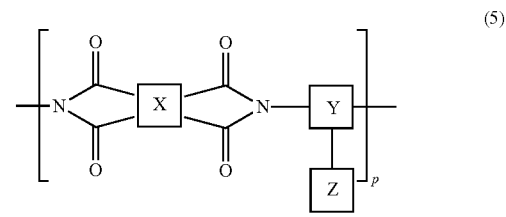

(5)

In chemical formulas (4) and (5), p is an arbitrary natural number. In chemical formulas (4) and (5), X has a structure expressed by any one of chemical formulas (6-1) to (6-16).

[C6]

(6-1)

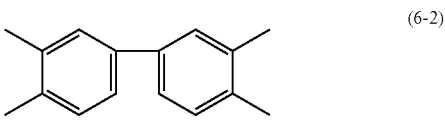

(6-2)

(6-3)

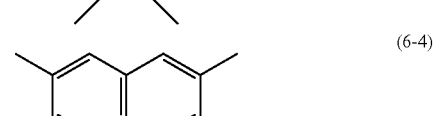

(6-4)

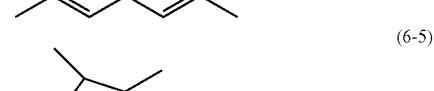

(6-5)

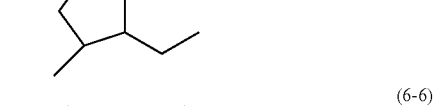

(6-6)

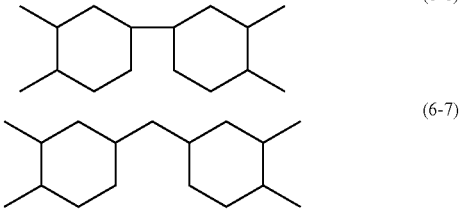

(6-7)

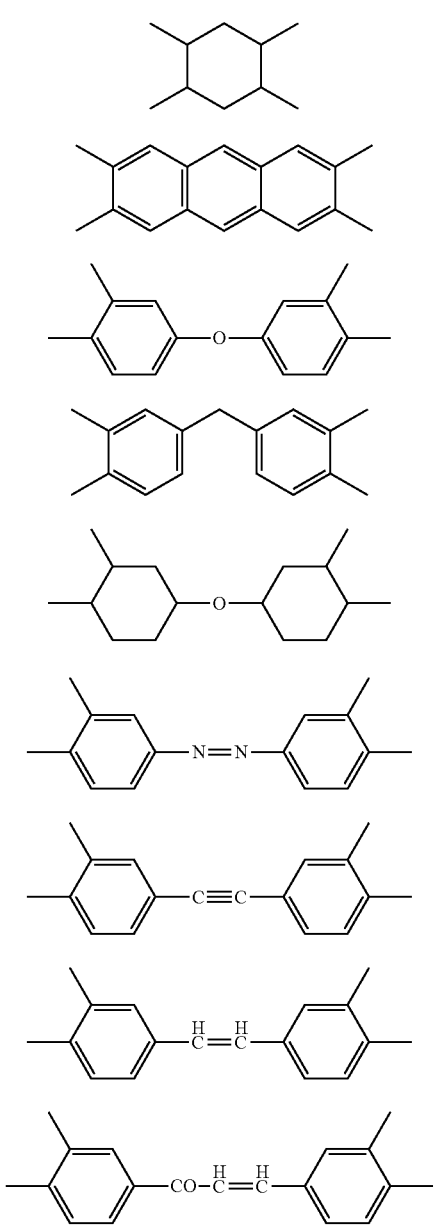
In chemical formulas (4) and (5), Y has a structure expressed by any one of chemical formulas (7-1) to (7-24).
[C7]
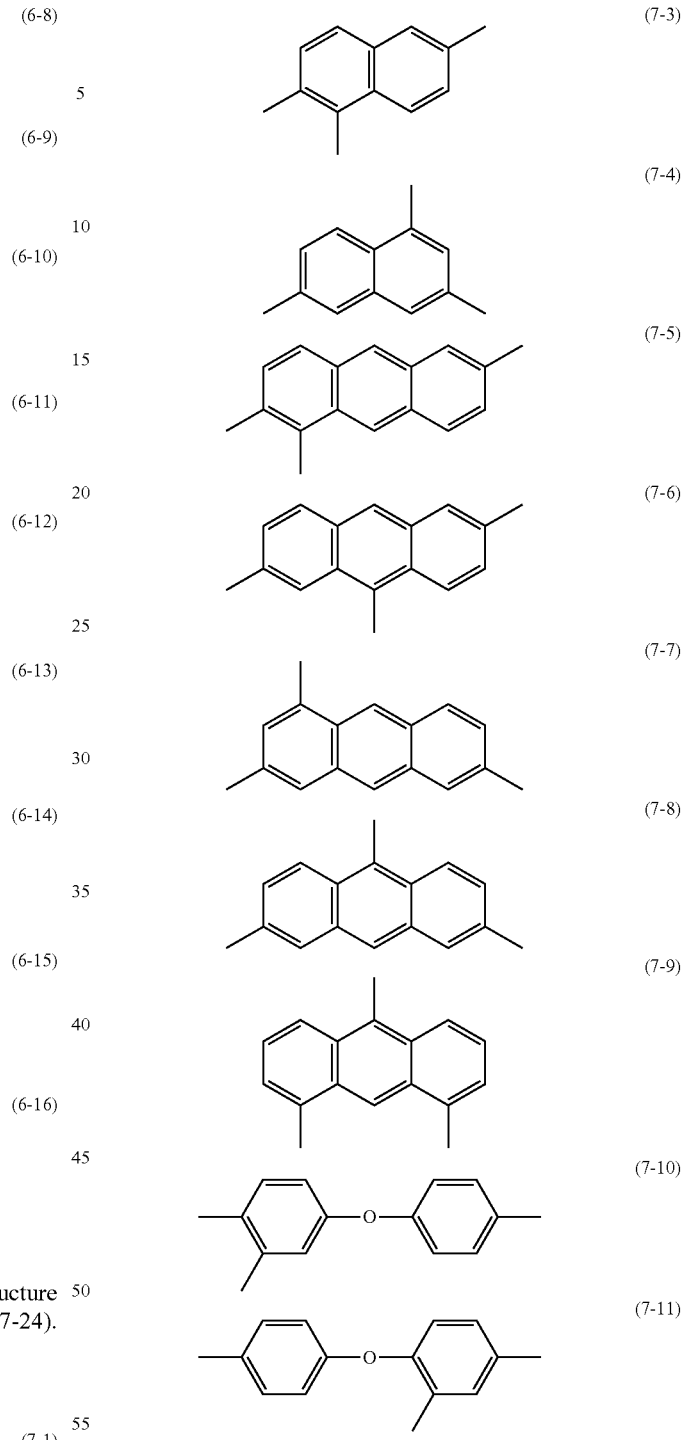

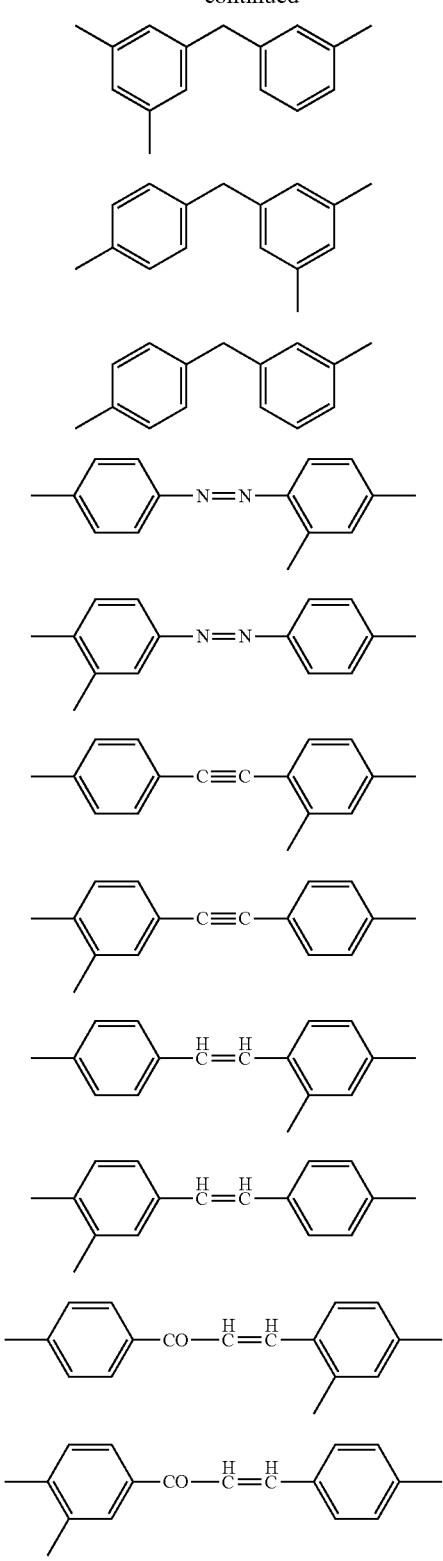

(7-14)
(7-15)
(7-16)
(7-17)
(7-18)
(7-19)
(7-20)
(7-21)
(7-22)
(7-23)
(7-24)

In chemical formulas (4) and (5), Z is a side; chain. Z has any structure as long as it does not affect achievement of the object of the present invention. Z is not essential. If Z is removed from chemical formulas (4) and (5), a bond functional group in each of chemical formulas (7-1) to (7-24) includes any two parts.

The imidization of the polyamic acid expressed by chemical formula (4) may be performed by heating the polyamic acid at higher temperature (e.g., in a range from 200 to 250° C.). Alternatively, a chemical imidization method that uses acetic anhydride for dehydrating agent and pyridine for catalyst may be used. An imidization rate in the imidization of the polyimide expressed by chemical formula (5) may be, but not limited to, 50% or greater. If the imidization rate is less than 50%, a thiourethane bond that is insoluble in the liquid crystal material or other bonds (—C6H4-NH—CS—O—) are more likely to occur due to reactions between isothiocyanate groups and carboxyl groups in the liquid crystal material.

The alignment film OM may be a horizontal alignment film with an alignment direction horizontal to a surface of the substrate or a vertical alignment film with an alignment direction vertical to the surface of the substrate.

A polymerization procedure for the polyamic acid is not limited and any known procedure may be used. The polyamic acid may be prepared in a form of liquid or sol composition (alignment agent) having flowability.

In this embodiment, the alignment film OM (the alignment film OM1, the alignment film OM2) is formed on the surface of each of the TFT substrate 101 and the slot substrate 201.

To form the alignment film OM, an alignment agent containing the polyamic acid expressed by chemical formula (4) is applied on the surface of each of the substrates 101 and 201 using a coater. The alignment agent is not cured and has flowability. The coated substrates are preheated (e.g., at 80° C. for two minutes) and then heated (e.g., at 210° C. for ten minutes). The coated and heated substrates are rubbed to obtain the alignment film OM having the function for orientating the molecules in the liquid crystal compound. The polyamic acid is imidized during preheating or heating.

Liquid Crystal Layer LC (Liquid Crystal Compound)

A liquid crystal compound that contains an isothiocyanate group with dielectric anisotropy ($\Delta\varepsilon$) that is higher (e.g., 10 or greater) is used for the liquid crystal material (the liquid crystal compound) in the liquid crystal layer. A compound expressed by chemical formula (3-1) or (3-2) may be used for the liquid crystal compound that contains the isothiocyanate group.

[C8]

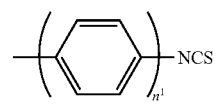

(3-1)

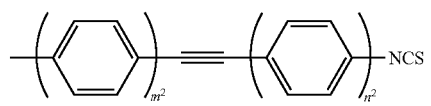

(3-2)

In chemical formulas (3-1) and (3-2), $n^1$, $m^2$, and $n^2$ are integers from 1 to 5. H in the phenylene group may be replaced with F or Cl.

The liquid crystal material may include a liquid crystal compound other than the liquid crystal compound that contains the isothiocyanate group as long as the object of the present invention is achieved.

Antenna Unit U

Figure 8:
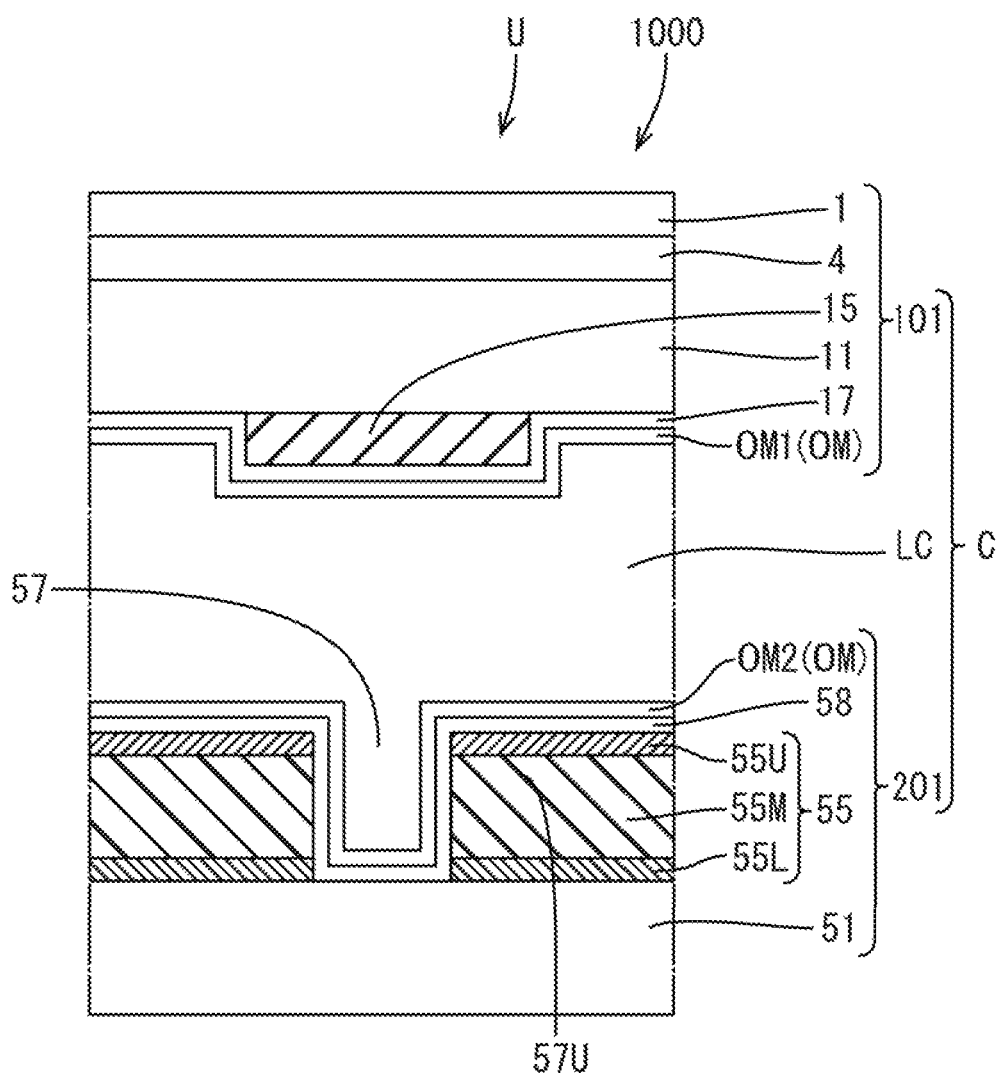
FIG. 8 is a cross-sectional view schematically illustrating a TFT substrate, a liquid crystal layer, and a slot substrate constituting an antenna unit of a scanning antenna.

FIG. 8 is a cross-sectional view schematically illustrating sections of the TFT substrate 101, the liquid crystal layer LC, the slot substrate 201 included in the antenna unit U of the scanning antenna 1000. As illustrated in FIG. 8, in the antenna unit U, the patch electrode 15 of the TFT substrate 101 having the island shape is opposed to the slot 57 (the slot electrode unit 57U) in a form of a hole (a groove) included in the slot substrate 55 via the liquid crystal layer LC. These scanning antenna 1000 includes a liquid crystal cell C. The liquid crystal cell C includes the liquid crystal layer LC, the TFT substrate 101, and the slot substrate 201. The liquid crystal layer LC is sandwiched between the TFT substrate 101 and the slot substrate 201. The TFT substrate 101 includes the alignment film OM1 on the surface facing the liquid crystal layer LC. The slot substrate 201 includes the alignment film OM2 on the surface facing the liquid crystal layer LC. In this description, each antenna unit U includes one patch electrode 15 and the slot electrode 55 in which at least one slot 57 corresponding to the patch electrode 15 is provided (the slot electrode unit 57U).

Sealant

Figure 9:
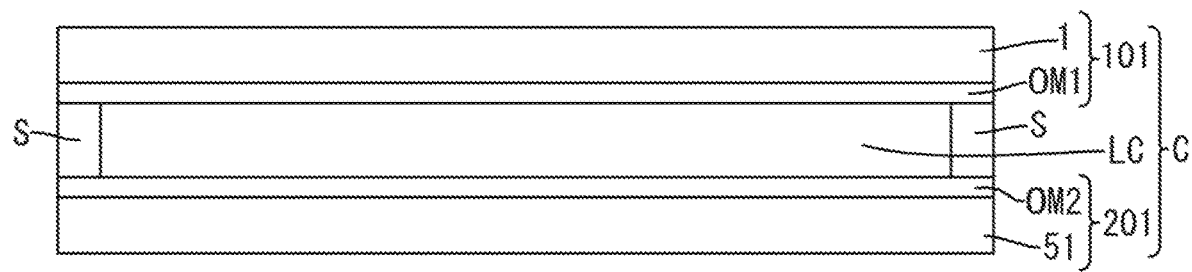
FIG. 9 is a cross-sectional view schematically illustrating a configuration of a liquid crystal cell.

FIG. 9 illustrates a cross-sectional view schematically illustrating a configuration of the liquid crystal cell C. A sealant S is disposed to surround the liquid crystal layer LC between the TFT substrate 101 and the slot substrate 201 included in the liquid crystal cell C. The sealant S is bonded to the TFT substrate 101 and the slot substrate 201 to bind the TFT substrate 101 and the slot substrate 201 together. The TFT substrate 101 and the slot substrate 201 form, a pair of substrates opposed to each other with the liquid crystal layer LC sandwiched therebetween.

The sealant S is a hardened material prepared by hardening sealant composition that contains curable resin. The sealant composition includes at least a photo-radical polymerization initiator and a curable resin (a polymerization component).

The photo-radical polymerization initiator is a compound that produces a radical when light with a wavelength of 450 run or greater is applied. Examples of the photo-radical polymerization initiator include camphorquinone compound such as camphorquinone, benzyl trimethyl benzoyl diphenyl phosphine oxide, methyl thioxanthone, and pentafluorophenyl.

The photo-radical polymerization initiator may have a structure selected from camphorquinone compound such as camphorquinone, benzyl trimethyl benzoyl diphenyl phosphine oxide, methyl thioxanthone, and pentafluorophenyl.

Examples of the camphorquinone compound include a compound (anti-(1R)-(+)-camphorquinone-3-oxime) expressed by chemical formula (9-1) and a compound ((±)-camphorquinone) expressed by chemical formula (9-2).

[C9]

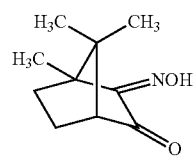

(9-1)

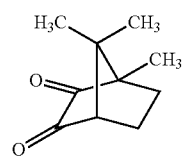

(9-2)

The photo-radical polymerization initiator may include a polymerizable functional group that is polymerizable in the molecule using a radical. The polymerizable functional group may be selected from, but not limited to as long as the object of the present invention can be achieved, an acryloyl group, a methacryloyl group, an acrylamide group, and a methacrylamide group. The polymerizable functional group included in the photo-radical polymerization initiator is polymerized with a curable resin (a polymerization component) and taken into the resin component that is cured. Elution of the photo-radical polymerization initiator to the liquid crystal layer and generation of radical through reception of light by the photo-radical polymerization initiator are less likely to occur.

An example of the photo-radical polymerization initiator including the polymerizable functional group includes a compound expressed by chemical formula (1) provided below.

[C10]

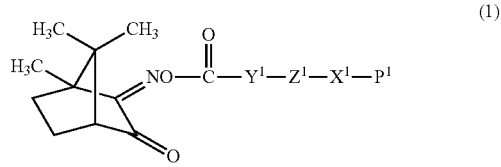

(1)

In chemical formula (1), $P^1$ may be the acryloyl group, the methacryloyl group, the acrylamide group, or a methacrylamide group. $X^1$ and $Y^1$ may have structures expressed by chemical formulas (2-1) and (2-2) provided below. $Z^1$ may be O, COO, OCO, NHCO, CONH, S, or a direct bond.

[C11]

(2-1)

(2-2)

In chemical formula (2-1), $n^3$ may be any one of integers from 1 to 18. H may be replaced with a methyl group or a halogen group. In chemical formula (2-2), $n^4$ may be any one of integers from 1 to 18. H may be replaced with a methyl group or a halogen group. If either $X^1$ or $Y^1$ has the structure expressed by chemical formula (2-2), $Z^1$ may be CO or a direct bond. $X^1$ and $Y^1$ do not have the structure expressed by chemical formula (2-2) at the same time.

An example of the compound expressed by chemical formula (1) includes a compound expressed by chemical formula (12) provided below.

[C12]

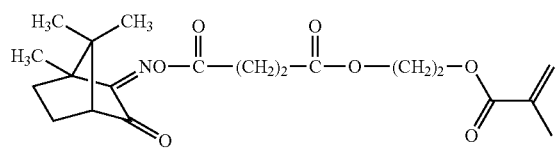

(12)

Figure 10:
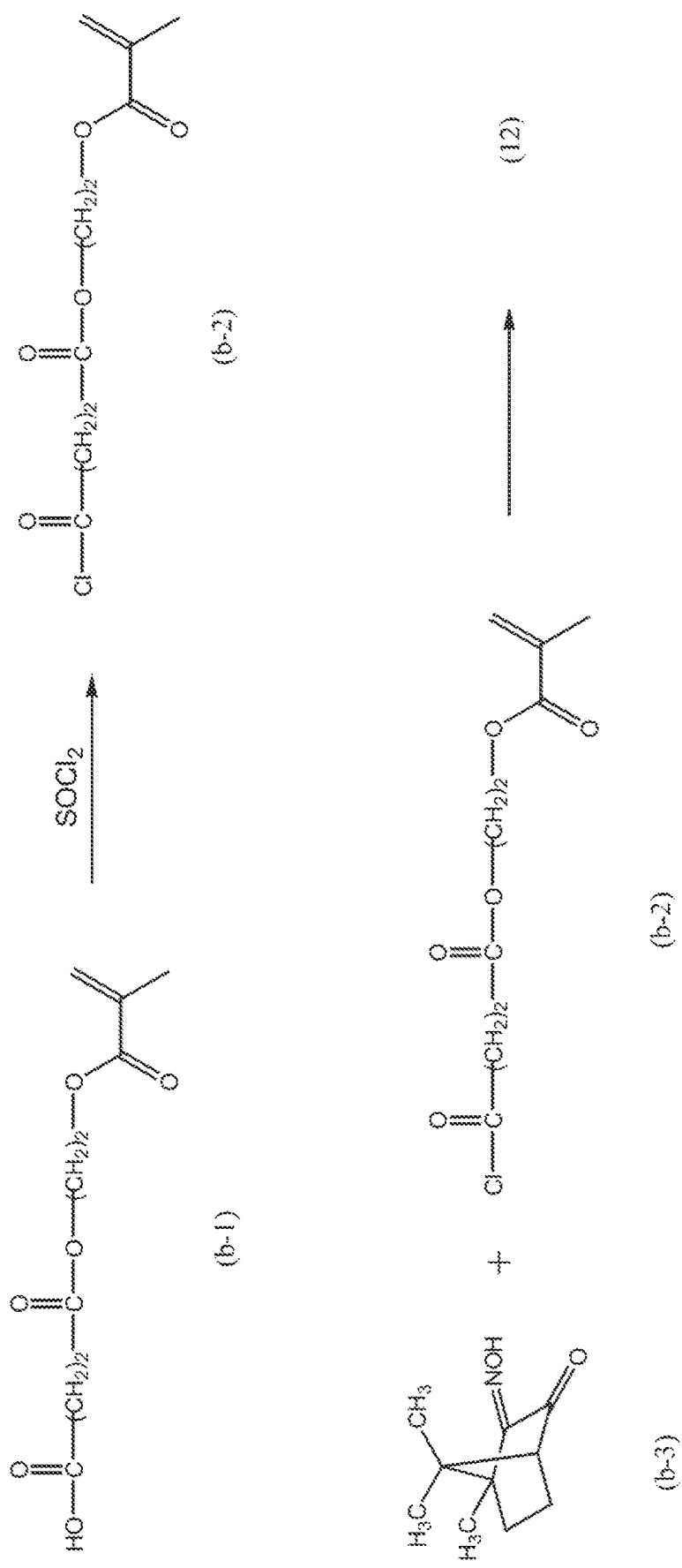
FIG. 10 is a view illustrating a scheme of synthesis of a camphorquinone-based compound that contains a polymerizable functional group.

An example of synthesis of the camphorquinone compound that contains the polymerizable functional group expressed by chemical formula (12) will be described with reference to FIG. 10. FIG. 10 illustrates a scheme of synthesis of the camphorquinone compound that contains the polymerizable functional group. 20 ml of a first benzene solution including 2.3 g (10 mmol) of a compound expressed by chemical formula (b-1) (methacryloyloxyethyl succinate, molecular weight: 230) was prepared. A proper amount of thionyl chloride (SOC12) was dropped in the first benzene solution. As a result, a compound (carboxylic acid chloride) expressed by chemical formula (b-2) was prepared.

Then, a second benzene solution (20 ml) including 1.8 g (10 mmol) of a compound (camphorquinone-3-oxime, molecule weight: 181) expressed by chemical formula (b-3) and 1.2 g (12 mmol) of trimethylamine was dropped in the first benzene solution under a nitrogen atmosphere. A mixture of the first benzene solution and the second benzene solution was stirred for ten hours while a reaction between the compound expressed by chemical formula (b-3) and the compound expressed by chemical formula (b-2) progressed. After the reaction, impurities in the mixture were removed with water. A reactant in the mixture was purified using column chromatography (normal phase column, developing solvent includes toluene:ethyl acetate=4:1 (v/v)). As a result, 2.45 g (yield of 75%) of a compound (molecule weight: 393) expressed by chemical solution (12) was obtained.

One of the photo-radical polymerization initiators described above may be used alone or two or more of the photo-radical polymerization initiators may be used in combination.

With the photo-radical polymerization initiators described above, visible light in a longer wavelength range (visible light with a wavelength of 450 run or greater) in comparison to a wavelength of light absorbed by the compound, that contains the iso thiocyanate group is absorbed and the radical is generated, so that photofragmentation of the compound that contains the isothiocyanate group, illustrated in FIG. 1, does not progress.

A compound (a polymerization component) including a polymerizable functional group that is polymerizable using the radical generated by a photo-radical polymerization initiator may be used for the curable resin. For prompt progress of curing reaction in application of the sealant composition by a dropping injection method (an ODF method) in a process of producing a liquid crystal cell and preferable adhesiveness, a curable resin that includes a (meth)acryloyl group and/or an epoxy group may be used. Examples of such a curable resin include a (meth)acrylate and an epoxy resin. They may be used alone or two or more of them may be used in combination. In this description, (meth)acrylic may refer to acrylic or methacrylic.

The (meth)acrylate described above may be, but not limited to as long as the object of the present invention can be achieved, urethane (meth)acrylate including an urethane bond or epoxy (meth)acrylate derived from a compound including a glycidyl group and (meth)acrylic acid.

The urethane (meth)acrylate described above may be, but not limited to as long as the object of the present invention can be achieved, derivatives from diisocyanate, acrylic acid, and a reactive compound that undergoes an addition reaction from isocyanate. The diisocyanate may be isophorone diisocyanate. The isocyanate may be hydroxyethyl acrylate. The derivatives may be chain-extended using caprolactone or polyol. Commercialized products under trade names of "U-122P," "U-340P," "U-4HA," "U-4HA," "U-1084A" (manufactured by Shin-Nakamura Chemical Co., Ltd.), "KRM7595," "KRM7610," and "KRM7619" (manufactured by Daicel-UCB Co., Ltd.) are examples of the urethane (meth)acrylate.

The epoxy (meth)acrylate described above may be, but not limited to as long as the object of the present invention can be achieved, an epoxy (meth)acrylate derived from an epoxy resin and an (meth)acrylic acid. The epoxy resin may be a bisphenol A type epoxy resin or propylene glycol diglycidyl ether. Commercialized products under trade; names of "EA-1020," "EA-6320," "EA-5520" (manufactured by Shin-Nakamura Chemical Co., Ltd.), "epoxy ester 70PA," and "epoxy ester 3002A" (KYOEISHA CHEMICAL CO., LTD.) are examples of the epoxy (meth)acrylate.

Other examples of the (meth)acrylate include methyl methacrylate, tetrahydrofurfuryl methacrylate, benzyl methacrylate, isobornyl methacrylate, 2-hydroxyethyl methacrylate, glycidyl methacrylate, (poly)ethylene glycol dimethacrylate, 1,4-butanediol dimethacrylate, 1,6-hexanediol dimethacrylate, trimethylolpropane triacrylate, pentaerythritol triacrylate, and glycerol dimethacrylate.

The epoxy resin described above may be, but not limited to as long as the object of the present invention can be achieved, phenol novolac type epoxy resin, cresol novolac type epoxy resin, biphenyl novolac type epoxy resin, trisphenol novolac type epoxy resin, dicyclopentadiene novolac type epoxy resin, bisphenol A type epoxy resin, bisphenol F type epoxy resin, 2,2'-diallyl bisphenol A type epoxy resin, bisphenol S type epoxy resin, hydrogenated bisphenol A type epoxy resin, propylene oxide added bisphenol A type epoxy resin, biphenyl type epoxy resin, naphthalene type epoxy resin, resorcinol type epoxy resin, or glycidyl amines.

A commercialized product under a trade name of "NC-3000S" (manufactured by Nippon Kayaku Co., Ltd.) may be an example of the phenol novolac type epoxy resin among the epoxy resin described above. Commercialized products under trade names of "EPPN-501H" "EPPN-501H" (manufactured by Nippon Kayaku Co., Ltd.) may be examples of the trisphenol novolac type epoxy resin. A commercialized product under a trade name of "NC-7000L" (manufactured by Nippon Kayaku Co., Ltd.) may be an example of the dicyclopentadiene novolac type epoxy resin. Commercialized products under trade names of "EPICLON 840S" and "EPICLON 850CRP" (manufactured by Dainippon Ink and Chemicals, incorporated) may be examples of the bisphenol A type epoxy resin. Commercialized products under trade names of "Epikote 807" (Japan Epoxy Resins Co., Ltd) and "EPICLON 830" (manufactured by Dainippon Ink and Chemicals, incorporated) may be examples of the bisphenol F type epoxy resin. A commercialized product under a trade name of "RE310NM" (manufactured by Nippon Kayaku Co., Ltd.) may be an example of the 2,2'-diallyl bisphenol A type epoxy resin. A commercialized product under a trade name of "EPICLON 7015 (manufactured by Dainippon Ink and Chemicals, incorporated) may be an example of the hydrogenated bisphenol A type epoxy resin. A commercialized product under a trade name of "Epoxy Ester 3002A" (manufactured by KYOEISHA CHEMICAL CO., LTD.) may be an example of the propylene oxide added bisphenol A type epoxy resin. Commercialized products under trade names of "Epikote YX-4000H" and "YL-6121H" (Japan Epoxy Resins Co., Ltd) may be examples of the biphenyl type epoxy resin. A commercialized product under a trade name of "EPICLON HP-4032" (manufactured by Dainippon Ink and Chemicals, incorporated) may be an example of the naphthalene type epoxy resin. A commercialized product under a trade name of "DENACOL EX-201" (Nagase ChemteX Corporation" may be an example of the resorcinol type epoxy resin. Commercialized products under trade names of "EPICLON 430" (manufactured by Dainippon Ink and Chemicals, incorporated) and "Epikote 630" (Japan Epoxy Resins Co., Ltd) may be examples of the glycidyl amines.

An epoxy/(meth)acrylic resin including at least one (meth)acrylic group and one epoxy group in one molecule may be used for the curable resin (the polymerization component) in the sealant composition. Examples of such an epoxy/(meth)acrylic resin may include: a compound obtained by reaction of a portion of the epoxy group in the epoxy resin with the (meth)acrylic acid in the presence of catalyst; a compound obtained by reaction of ½ mole of (meth)acrylic monomer including a hydroxyl group and then ½ mole of glycidol with 1 mole of isocyanate including two or more functional groups; and a compound obtained by reaction of glycidole with (meth)acrylate including a isocyanate group. A commercialized product under a trade name of "UVAC1561" (manufactured by Daicel-UCB Co., Ltd.) may be an example of the epoxy/(meth)acrylic resin.

The sealant composition may include a hardener, a silane coupling agent, and a filler in addition to the photo-radical polymerization initiator.

If the sealant composition includes a curable resin (a polymerization component) (e.g., an epoxy resin, an epoxy/(meth)acrylic resin) containing thermally reactive functional groups (e.g., epoxy groups), the hardener is added to the sealant composition together with the curable resin. The hardener is for establishing cross-linkage between the thermally reactive functional groups in the curable resin (the polymerization component) through reaction of the thermally reactive functional groups from heating. The hardener has a function for improving the adhesiveness and moisture resistance of the cured sealant composition (i.e., the sealant S).

It is preferable, but not limited to as long as the object of the present invention can be achieved, the hardener includes amine and/or thiol group that has advantages in low-temperature response for curing the sealant composition at a temperature in a range from 100° C. to 120° C. during application of the sealing composition by the dropping injection method (the ODF method) in the process of producing the liquid crystal cell. The hardener described above may be, but not limited to as long as the object of the present invention can be achieved, 1,3-bis[hydrazinocarboethyl-5-isopropylhydatoin], hydrazide compound such as adipic dihydrazide; dicyandiamide, guanidine derivative, 1-cyanoethyl-2-phenylimidazole, N-[2-(2-methyl-1-imidazolyl)ethyl]urea, 2,4-diamino-6-[2'-methylimidazolyl-(1')]-ethyl-s-triazine, N,N'-bis(2-methyl-1-imidazolylethyl)urea, N,N'-(2-methyl-1-imidazolylethyl)-adipamide, 2-phenyl-4-methyl-5-hyaroxymethylimidazole, 2-imidazoline-2-thiol, 2-2'-thiodiethanethiol, and addition products of amines and epoxy resins. One of the above or a combination of two or more of the above may be used.

The silane coupling agent has a function for improving adhesiveness between the cured sealant composition (i.e., the sealant S) and the substrates. The selane coupling agent may be, but not limited to as long as the object of the present invention can be achieved, γ-aminopropyltrimethoxysilane, γ-mercaptopropyltrimethoxysilane, γ-glycidoxypropyltrimethoxysilane, γ-isocyanatepropyltrimethoxysilane, or imidazolesilane compound that has a structure in which an alkoxylyl group is bound to an imidazole skeleton via a spacer group. They are preferable because they have higher adhesiveness with the substrates and are chemically bound to the curable resin so that they are less likely to flow into the liquid crystal material. One of the above or a combination of two or more of the above may be used.

The filler may be added to the sealant composition for improving the adhesiveness through stress dispersion effect or the coefficient of liner expansion as long as the object of the present invention can be achieved. Examples of the filler include inorganic fillers such as silica, diatom earth, alumina, zinc oxide, iron oxide, magnesium oxide, tin oxide, titanium oxide, magnesium hydroxide, aluminum hydroxide, magnesium carbonate, barium sulfate, calcium sulfate, calcium silicate, talc, glass beads, sericite, activated clay, bentonite, aluminum nitride, and silicon nitride. One of the above or a combination of two or more of the above may be used.

The sealant composition, may further include other components such as a thermos-radical polymerization initiator, a gellant, and a sensitizer where appropriate.

Examples of the thermos-radical polymerization initiator may include an azo compound and organic peroxide. Examples of the azo compound may include 2,2'-azobis(2, 4-dimethylvaleronitrile) and azobisisobutyronitrile. Examples of the organic peroxide may include benzoyl peroxide, ketone peroxide, peroxy ketal, hydroperoxide, dialkyl peroxide, peroxy ester, diacyl peroxide, and peroxydicarbonate.

Basically, a solventless sealant composition is used.

Method of Producing the Scanning Antenna

A method of producing the scanning antenna (a method of producing a liquid crystal cell C) includes a process of bonding the TFT substrate 101 and the slot substrate 201 together with the sealant S and injecting the liquid crystal layer LC into a space between the TFT substrate 101 and the slot substrate 201. The dropping injection method (the ODF method) may be used for injecting the liquid crystal material. The method of producing the liquid crystal cell C using the dropping injection method will be described.

Figure 11:
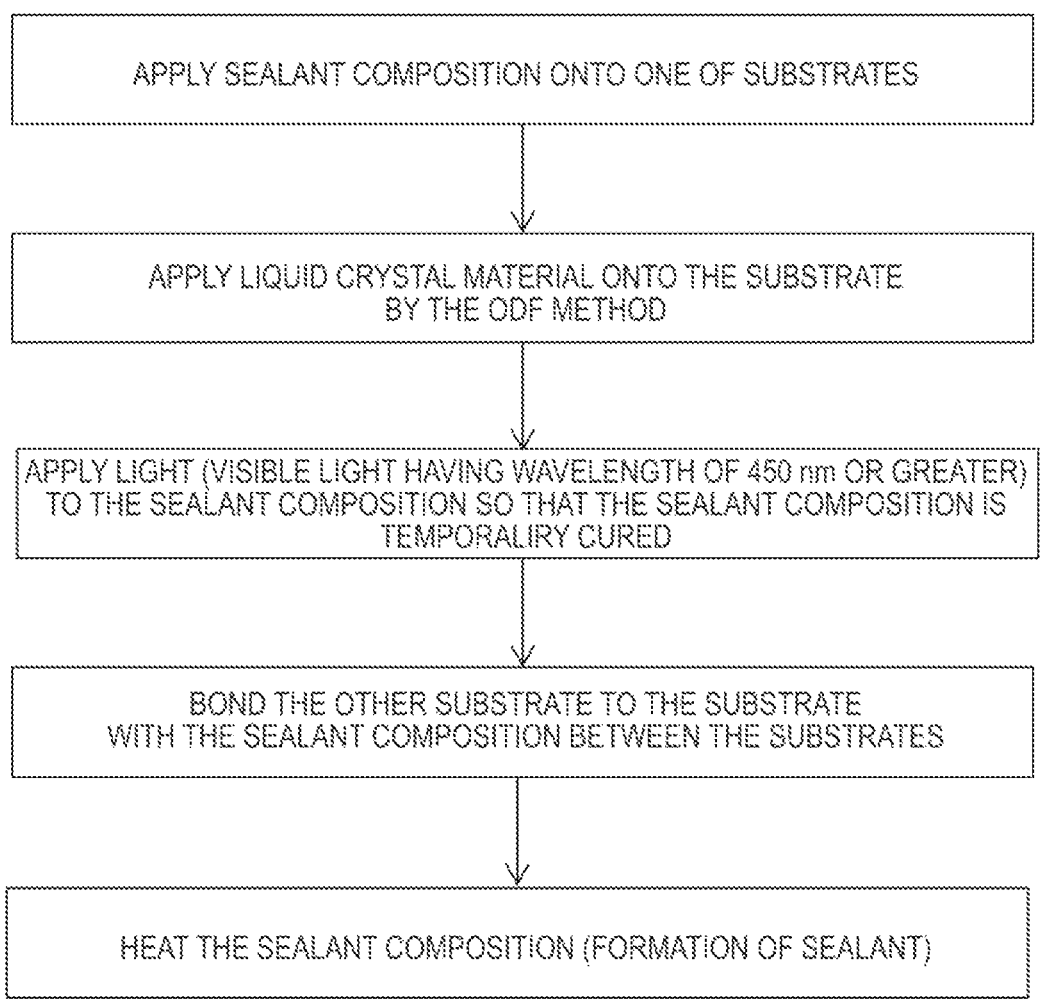
FIG. 11 is a flowchart illustrating a process for producing a liquid crystal cell using a dropping injection method.

FIG. 11 is a flow chart illustrating steps of producing the liquid crystal cell C using the dropping injection method. As illustrated in FIG. 11, the sealant composition is applied onto one of the TFT substrate 101 and the slot substrate 201 that are prepared in advance (in this example, onto the TFT substrate 101) using a sealant dispenser so that the sealant forms a frame shape (STEP 1). The sealant composition includes the photo-radical polymerization initiator (e.g., the compound expressed by chemical formula (12)), the curable resin (e.g., an epoxy/(meth)acrylic resin), and the hardener. Next, the liquid crystal material (the liquid crystal compound that contains the isothiocyanate group) is applied (dropped) onto the substrate (the TFT substrate 101) using the ODF method (STEP 2). Then, light with a wavelength of 450 nm or greater is applied to the sealant composition so that the sealant composition is temporarily cured (STEP 3). Then, the radical is generated from the photo-radical polymerization initiator and the curable resin is temporarily cured using the radical.

Next, the substrate (the TFT substrate 101) and the other substrate (the slot substrate 201) are bonded together with the temporarily cured sealant composition sandwiched therebetween (STEP 4). Then, the sealant composition is heated so that the sealant composition is permanently cured (STEP 5) through the cross-linkage reaction between the hardener and the thermally reactive functional groups (the epoxy groups). The TFT substrate 101 and the slot substrate 201 are bonded together. The liquid crystal cell C is produced using the dropping injection method.

After the liquid crystal cell C is produced using the liquid crystal dropping method as described above, the reflective conductive plate 65 is disposed on a cell side so that the reflective conductive plate 65 is opposed to an opposite surface of the slot substrate 201 (the second dielectric substrate 51) via a dielectric (the air layer) 54. Through the steps, the scanning antenna according to this embodiment is produced.

In this embodiment, the sealant composition is applied to the liquid crystal cell used for the scanning antenna. As long as the object of the present invention can be achieved, the sealant composition may be applied to liquid crystal cells for other-devices (e.g., a liquid crystal ceil including liquid crystal as am optical component for a liquid crystal lens to control a focal distance by adjusting an application voltage).

PRACTICAL EXAMPLES

The present invention will be described in more detail based on practical examples. However, the present invention is not limited to the practical examples.

Practical Example 1

Production of the Liquid Crystal Cell for the Scanning Antenna

A TFT substrate and a slot substrate 201 having basing configurations of the TFT substrate 101 and the slot substrate 201 included in the liquid crystal cell included in the scanning antenna 1000, respectively, are prepared. Alignment films of the TFT substrate and the slot substrate are formed using a rubbing agent, which will be described later.

The rubbing agent is prepared by dissolving a polyamic acid expressed by chemical formula (4) in an organic solvent. In chemical formula (4), X corresponds to chemical formula (6-5) and Y corresponds to chemical formula (7-10). The polyamic acid in this case does not include Z, NMP (N-methyl-2-pyrrolidone) is used for the organic solvent.

To form the alignment films on the TFT substrate and the slot substrate, the rubbing agent is applied to the substrates using the ink-jet method to form films of the rubbing agent on the substrates, respectively. The films on the substrates are heated at 80° C. for 2 minutes (preheating) and then at 210° C. for 10 minutes (heating).

The rubbing treatment (alignment) is performed on the films on the substrates. With the rubbing treatment, the alignment films are formed on surfaces of the TFT substrate and the slot substrate from the rubbing agent.

A photocrosslinkable and thermoscurable sealant composition, which will be described later, is applied to a surface of the TFT substrate (on the alignment film side) to form a frame shape using a sealant dispenser. Light is applied to the sealant composition while cutting light with a wavelength of 450 nm or less (wavelength: 450 nm-600 nm) so that the sealant composition is temporarily cured. At the same time, the liquid crystal material (nematic-isotropic phase transition temperature (Tni): 125° C.) including a liquid crystal compound that contains an isothiocyanate group expressed by chemical formula (3-1) or (3-2) is dropped within an area defined by the sealant composition in the frame shape by the ODF method. The Tni of the liquid crystal material is obtained from analysis of thermal behavior of the liquid crystal material using a thermal characteristic measuring-device (manufactured by Mettler Toledo International Inc.) and a differential scanning calorimeter (DSC).

After the liquid crystal material spreads sufficiently in the area defined by the sealant composition in the frame shape, the TFT substrate and the slot substrate are bonded together with the sealant composition sandwiched therebetween and heated at 130° C. for 40 minutes so that the sealant composition is permanently cured and a reorientation process is performed on the liquid crystal material. Through the steps described above, the liquid crystal cell according to practical example 1 is prepared.

A composition that is curable with visible light is used for the sealant composition. The composition includes 2% by mass of a compound expressed by chemical formula (13) provided below (n=2), 30% by mass of (meth)acrylic monomer, 20% by mass of epoxy monomer, 15% by mass of epoxy monomer hardener, 3% by mass of silane coupling agent, and 30% by mass of inorganic filler. The compound expressed by chemical formula (13) is a photo radical polymerization initiator that generates a radical with light with a wavelength of 450 run or greater.

[C13]

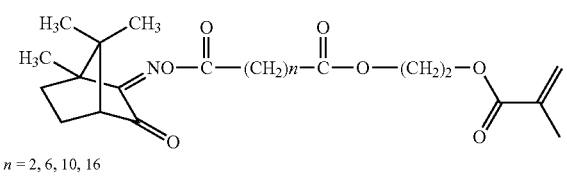

Practical Example 2

Practical example 2 includes 2% by mass of a compound expressed by chemical formula (13) (n=6, generates a radical with light with a wavelength of 450 nm or greater) instead of the photo radical polymerization initiator included in practical example 1. Other than that, a liquid crystal cell according to practical example 2 is prepared in a similar manner to practical example 1 using a sealant composition prepared in a similar manner to practical example 1.

Practical Example 3

Practical example 3 includes 2% by mass of a compound expressed by chemical formula (13) (n=10, generates a radical with light with a wavelength of 450 nm or greater) instead of the photo radical polymerization initiator included in practical example 1. Other than that, a liquid crystal cell according to practical example 3 is prepared in a similar manner to practical example 1 using a sealant composition prepared in a similar manner to practical example 1.

Practical Example 4

Practical example 4 includes 2% by mass of a compound expressed by chemical formula (13) (n=16, generates a radical with light with a wavelength of 450 nm or greater) instead of the photo radical polymerization initiator included in practical example 1. Other than that, a liquid crystal cell according to practical example 4 is prepared in a similar manner to practical example 1 using a sealant composition prepared in a similar manner to practical example 1.

Practical Example 5

Practical example 5 includes 2% by mass of a compound expressed by chemical formula (14) (camphorquinone-3-oxime) instead of the photo radical polymerization initiator included in practical example 1. Other than that, a liquid crystal cell according to practical example 5 is prepared in a similar manner to practical example 1 using a sealant composition prepared in a similar manner to practical example 1.

[C14]

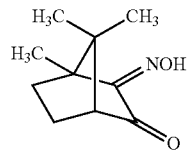

(14)

Comparative Example 1

Comparative example 1 includes 2% by mass of a compound under a trade name of "Irgacure-OXE01" (1,2-octandionel-[4-(phynylthio)-2-(O-benzoyloxime)], manufactured by BASF Japan Ltd.) instead of the photo radical polymerization initiator included in practical example 1. A liquid crystal cell according to comparative example 1 is prepared in a similar manner to practical example 1 using a sealant composition prepared in a similar manner to practical example 1 except for application of ultraviolet light with a wavelength of 365 run during temporary curing instead of the visible light.

Light Irradiation Test Under High Temperature

A light irradiation test under high temperature was conducted on the liquid, crystal cells of practical examples 1 to 5 and comparative example 1. In a constant temperature oven including an internal space exposed to light from an external fluorescent tube via a glass window and being maintained at 90° C., the liquid crystal cells were placed for 500 hours (for aging). Voltage holding ratios (VHRs) and remaining DC (rDC) voltages of the liquid crystal cells before and after the test (at a start of the test (0 hour) and 500 hours since the start of the test) were measured. The voltage holding ratios were measured using a VHR measurement system motel 6254 (manufactured by TOYO Corporation) under the condition of 1 V and 70° C. Measurements are provided in table 1. The remaining DC voltages (V) were measured by a flicker eliminating method after a 2-V DC offset voltage was applied to each liquid crystal cell for two hours in the oven at 40° C. Measurements are provided in table 1.

TABLE 1

| | POLYMER-IZATION INITIATOR | 0 HOUR | | AFTER 500 HOURS | |
|---|---|---|---|---|---|
| | | VHR (%) | rDC (V) | VHR (%) | rDC (V) |
| PRACTICAL EXAMPLE 1 | FORMULA (13), n = 2 | 81 | 0.07 | 42 | 0.23 |
| PRACTICAL EXAMPLE 2 | FORMULA (13), n = 6 | 81 | 0.07 | 47 | 0.21 |
| PRACTICAL EXAMPLE 3 | FORMULA (13), n = 10 | 82 | 0.07 | 49 | 0.20 |
| PRACTICAL EXAMPLE 4 | FORMULA (13), n = 16 | 82 | 0.07 | 49 | 0.17 |
| PRACTICAL EXAMPLE 5 | FORMULA (14) | 81 | 0.09 | 28 | 0.48 |
| COMPARATIVE EXAMPLE 1 | IrgacureOXE01 | 53 | 0.32 | 15 | 0.62 |

In the liquid crystal cells of practical examples 1 to 4, the compounds expressed by chemical formula (13) (n=2, 6, 10, 16) for the photo-radical polymerization initiators in the sealant compositions. Each of the compounds includes a methacryloyl group as a polymerizable functional group and generates a radical through absorption of light with a wavelength of 450 nm or greater. According to table 1, the VHRs at the start of the test (0 hour) and rDCs of the liquid crystal cells of practical examples 1 to 4 are greater than 80% and less than 0.1 V, respectively. The VHRs after 500 hours and the rDC of the liquid crystal cells of practical examples 1 to 4 are greater than 40% and about 0.2 V, respectively. As the lengths of the alkylene groups in the photo-radical polymerization initiators in practical examples 1 to 4 increase (i.e., n in chemical formula (13) increases), the VHRs tend to slightly increase and the rDC tend to slightly decrease.

The liquid crystal cell of practical example 5 includes the compound expressed by chemical formula (14) for the photo-radical polymerization initiator in the sealant composition. The compound generates the radical through the absorption of the light having the wavelength of 450 nm or greater; however, the compound does not include the polymerizable functional group, which is included in the photo-radical polymerization initiator in each of practical examples 1 to 4. According to table 1, the VHR of the liquid crystal cell of practical example 5 at the start of the test (0 hour) is greater than 80% and the rDC is less than 0.1 V, which are similar to those of the practical example 1. The VHR of the liquid crystal cell of practical example 5 decreased to 28% after 500 hours and rDC was 0.48 V.

The liquid crystal cell of comparative example 1 includes the compound (Irgacure-OXE01) which generates the radical through absorption of ultraviolet light for the polymerization initiator in the sealant composition. According to table 1, the VHR of the liquid crystal cell of comparative example at the start of the test is 53%, which is lower, and rDC is greater than 0.3 V, which is higher. This may be because a part of the ultraviolet light irradiated to cure the sealant composition degraded the liquid crystal material (the liquid crystal compound that contains the isothiocyanate group). The VHR and the rDC of the liquid crystal cell of comparative example 1 after 500 hours decreased to 15% and increased above 0.62 V, respectively. This may be because an unreacted portion of the polymerization initiator eluted into the liquid crystal layer and the portion of the polymerization initiator may receive the light and generate the radical.

In practical examples 1 to 5, the polymerization components (e.g., (meth)acrylic monomers) in the sealant compositions were polymerized using the light (visible light) having the longer wavelength (wavelength: 450 nm or greater) which did not degrade the liquid crystal materials (the liquid crystal compounds including the isothiocyanate groups). Especially in practical examples 1 to 4, the photo-radical polymerization initiators include the polymerizable functional groups and thus the photo-radical initiators are polymerized, together with the polymerization components. In practical examples 1 to 4, the unreacted portions of the photo-radical polymerization initiators in the free state were less likely to remain in the sealants. Therefore, the VHRs at the start of the test (0 hour) are high and decreases in VHR after hours are small.

In comparison to comparative example 1 that generates the radical through application of ultraviolet light, the VHR of practical example 5 is greater and the rDC of practical example 5 is less. In comparison to practical examples 1 to 4 that include the polymerizable functional groups, the VHR and the rDC of practical example 5 are not preferable. This may be because the unreacted portion of the photo-radical polymerization initiator was eluted into the liquid crystal layer as time elapsed and the eluted portion of the photo-radical polymerization initiator may receive the light and generates the radical, resulting in the decrease in the VHR and the increase in the rDC.

Practical Example 6

Practical example 6 includes 2% by mass of a compound expressed by chemical formula (15) (m=2, generates a radical with light with a wavelength of 450 nm or greater) instead of the photo radical polymerization initiator included in practical example 1. Other than that, a liquid crystal cell according to practical example 6 is prepared in a similar manner to practical example 1 using a sealant composition prepared in a similar manner to practical example 1.

[C15]

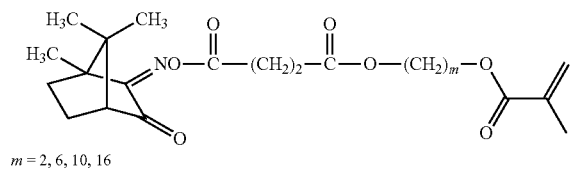

(15)

$m = 2, 6, 10, 16$

Practical Example 7

Practical example 7 includes 2% by mass of a compound expressed by chemical formula (15) (m=6, generates a radical with light with a wavelength of 450 nm or greater) instead of the photo radical polymerization initiator included in practical example 1. Other than that, a liquid crystal cell according to practical example 7 is prepared in a similar manner to practical example 1 using a sealant composition prepared in a similar manner to practical example 1.

Practical Example 8

Practical example 8 includes 2% by mass of a compound expressed by chemical formula (15) (m=10, generates a radical with light with a wavelength of 450 nm or greater) instead of the photo radical polymerization initiator included in practical example 1. Other than that, a liquid crystal cell according to practical example 8 is prepared in a similar manner to practical example 1 using a sealant composition prepared in a similar manner to practical example 1.

Practical Example 9

Practical example 9 includes 2% by mass of a compound expressed by chemical formula (15) (m=16, generates a radical with light with a wavelength of 450 nm or greater) instead of the photo radical polymerization initiator included in practical example 1. Other than that, a liquid crystal cell according to practical example 9 is prepared in a similar manner to practical example 1 using a sealant composition prepared in a similar manner to practical example 1.

Light Irradiation Test Under High Temperature

A light irradiation test under nigh temperature was conducted on the liquid crystal cells of practical examples 6 to 9. Voltage holding ratios (VHRs) and remaining DC (rDC) voltages of the liquid crystal cells at a start of the test (0 hour) and after 500 hours since the start of the test were measured, similar to practical example 1. Measurements are provided in table 2.

TABLE 2

| | POLYMER-IZATION INITIATOR | 0 HOUR | | AFTER 500 HOURS | |
|---|---|---|---|---|---|
| | | VHR (%) | rDC (V) | VHR (%) | rDC (V) |
| PRACTICAL EXAMPLE 6 | FORMULA (15), m = 2 | 83 | 0.07 | 45 | 0.22 |
| PRACTICAL EXAMPLE 7 | FORMULA (15), m = 6 | 83 | 0.07 | 46 | 0.22 |
| PRACTICAL EXAMPLE 8 | FORMULA (15), m = 10 | 83 | 0.06 | 48 | 0.21 |
| PRACTICAL EXAMPLE 9 | FORMULA (15), m = 16 | 84 | 0.06 | 49 | 0.21 |

In the liquid crystal cells of practical examples 6 to 9, the compounds expressed by chemical formula (15) (m=2, 6, 10, 16) are used for the photo-radical polymerization initiators in the sealant compositions. The compounds include the methacryloyl groups for the polymerizable functional groups and generate the radicals through absorption of light having the wavelength of 450 nm or greater. The VHRs of the liquid crystal cells of practical examples 6 to 9 remained high and the rDC of them remained small even the lengths of the alkylene groups located closer to the polymerizable functional groups were altered in the same manner as practical example 1.

Practical Example 10

Practical example 10 includes 2% by mass of a compound expressed by chemical formula (16) (m=1, generates a radical with light with a wavelength of 450 nm or greater) instead of the photo radical polymerization initiator included in practical example 1. Other than that, a liquid crystal cell according to practical example 10 is prepared in a similar manner to practical example 1 using a sealant composition prepared in a similar manner to practical example 1.

[C16]

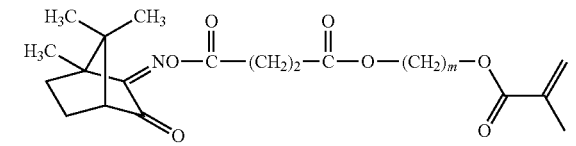

(16)

$m = 1, 4, 7, 10$

Practical Example 11

Practical example 11 includes 2% by mass of a compound expressed by chemical formula (16) (m=4, generates a radical with light with a wavelength of 450 nm or greater) instead of the photo radical polymerization initiator included in practical example 1. Other than that, a liquid crystal cell according to practical example 11 is prepared in a similar manner to practical example 1 using a sealant composition prepared in a similar manner to practical example 1.

Practical Example 12

Practical example 12 includes 2% by mass of a compound expressed by chemical formula (16) (m=7, generates a radical with light with a wavelength of 450 nm or greater) instead of the photo radical polymerization initiator included in practical example 1. Other than that, a liquid crystal cell according to practical example 12 is prepared in a similar manner to practical example 1 using a sealant composition prepared in a similar manner to practical example 1.

Practical Example 13

Practical example 13 includes 2% by mass of a compound expressed by chemical formula (16) (m=10, generates a radical with light with a wavelength of 450 nm or greater) instead of the photo radical polymerization initiator included in practical example 1. Other than that, a liquid crystal cell according to practical example 13 is prepared in a similar manner to practical example 1 using a sealant composition prepared in a similar manner to practical example 1.

Light Irradiation Test Under High Temperature

A light irradiation test under high temperature was conducted on the liquid crystal cells of practical examples 10 to 13. Voltage holding ratios (VHRs) and remaining DC (rDC) voltages of the liquid crystal cells at a start of the test (0 hour) and after 500 hours since the start of the test were measured, similar to practical example 1. Measurements are provided in table 3.

TABLE 3

| | POLYMER-IZATION INITIATOR | 0 HOUR VHR (%) | 0 HOUR rDC (V) | AFTER 500 HOURS VHR (%) | AFTER 500 HOURS rDC (V) |
|---|---|---|---|---|---|
| PRACTICAL EXAMPLE 10 | FORMULA (16), m = 1 | 82 | 0.07 | 51 | 0.20 |
| PRACTICAL EXAMPLE 11 | FORMULA (16), m = 4 | 82 | 0.06 | 51 | 0.20 |
| PRACTICAL EXAMPLE 12 | FORMULA (16), m = 7 | 83 | 0.06 | 52 | 0.18 |
| PRACTICAL EXAMPLE 13 | FORMULA (16), m = 10 | 84 | 0.06 | 52 | 0.18 |

The liquid crystal cells of practical examples 10 to 13 include the compounds expressed by chemical formula (16) for the photo-radical polymerization initiators in the sealant composition. In the compounds, the alkylene groups in practical example 1 and other examples were replaced with oxyethylene groups. The VHRs of the liquid crystal cells of practical examples 10 to 13 after 500 hours are greater than 50% and the rDC after 500 hours (after aging) are less in comparison to practical example 1 and other examples that include the alkylene groups (CH2)n. Greater improvement is achieved. This may be because the oxyethylene groups are included and thus the solubility of the photo-radical polymerization initiators that include the polymerizable functional groups in the liquid crystal layers (the liquid crystal materials) further decreases. Therefore, the VHRs after 500 hours may be improved.

Practical Example 14

Practical example 14 includes 2% by mass of a compound expressed by chemical formula (17) (n=2, generates a radical with light with a wavelength of 450 ran or greater) instead of the photo radical polymerization initiator included in practical example 1. Other than that, a liquid crystal cell according to practical example 14 is prepared in a similar manner to practical example 1 using a sealant composition prepared in a similar manner to practical example 1.

[C17]

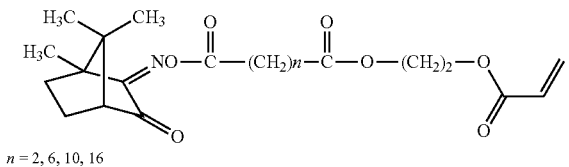

(17)

$n = 2, 6, 10, 16$

Practical Example 15

Practical example 15 includes 2% by mass of a compound expressed by chemical formula (17) (n=6, generates a radical with light with a wavelength of 450 nm or greater) instead of the photo radical polymerization initiator included in practical example 1. Other than that, a liquid crystal cell according to practical example 15 is prepared in a similar manner to practical example 1 using a sealant composition prepared in a similar manner to practical example 1.

Practical Example 16

Practical example 14 includes 2% by mass of a compound expressed by chemical formula (17) (n=10, generates a radical with light with a wavelength of 450 nm or greater) instead of the photo radical polymerization initiator included in practical example 1. Other than that, a liquid crystal cell according to practical example 16 is prepared in a similar manner to practical example 1 using a sealant composition prepared in a similar manner to practical example 1.

Practical Example 17

Practical example 17 includes 2% by mass of a compound expressed by chemical formula (17) (n=16, generates a radical with light with a wavelength of 450 nm or greater) instead of the photo radical polymerization initiator included in practical example 1. Other than that, a liquid crystal cell according to practical example 17 is prepared in a similar manner to practical example 1 using a sealant composition prepared in a similar manner to practical example 1.

Light Irradiation Test Under High Temperature

A light irradiation test under high temperature was conducted on the liquid crystal cells of practical examples 14 to 17. Voltage holding ratios (VHRs) and remaining DC (rDC) voltages of the liquid crystal cells at a start of the test (0 hour) and after 500 hours since the start of the test were measured, similar to practical example 1. Measurements are provided in table 4.

TABLE 4

| | POLYMER-IZATION INITIATOR | 0 HOUR VHR (%) | 0 HOUR rDC (V) | AFTER 500 HOURS VHR (%) | AFTER 500 HOURS rDC (V) |
|---|---|---|---|---|---|
| PRACTICAL EXAMPLE 14 | FORMULA (17), n = 2 | 80 | 0.08 | 42 | 0.25 |
| PRACTICAL EXAMPLE 15 | FORMULA (17), n = 6 | 80 | 0.08 | 45 | 0.23 |
| PRACTICAL EXAMPLE 16 | FORMULA (17), n = 10 | 80 | 0.07 | 46 | 0.22 |
| PRACTICAL EXAMPLE 17 | FORMULA (17), n = 16 | 81 | 0.07 | 46 | 0.20 |

In the liquid crystal cells of practical examples 14 to 17, the compounds expressed by chemical formula (17) (m=2, 6, 10, 16) are used for the photo-radical polymerization initiators in the sealant compositions. The compounds include the acryloyl groups that replace the methacryloyl groups in practical example 1 and other examples. The VHRs of the liquid crystal cells of practical examples 14 to 17 remained high and the rDC of them remained small even the polymerizable functional groups were altered.

In each of practical examples 14 to 17, the acryloyl group having the structure that is more flexible than that of the structure of the methacryloyl group. According to the configuration, the polymerization rate of the photo-radical polymerization initiator improves. With the methacryloyl group as in practical example 1 and other examples, the solubility of the photo-radical polymerization initiator in the liquid crystal material (the liquid crystal layer) can be reduced because of the rigidity and development of conjugate structures.

EXPLANATION OF SYMBOLS

1: Dielectric substrate (First dielectric substrate)
3: Gate electrode
4: Gate insulating layer
5: Semiconductor layer
6D: Drain contact layer
6S: Source contact layer
7D: Drain electrode
7S: Source electrode
10: TFT
11: First insulating layer
15: Patch electrode
17: Second insulating layer
51: Dielectric substrate (Second dielectric substrate)
55: Slot electrode
55L: Lower layer
55M: Main layer
55U: Upper layer
57: Slot
57U: Slot electrode unit
58: Third electrode
70: Feeding device
72: Feeding pin
101: TFT substrate
201: Slot substrate
1000: Scanning antenna
U: Antenna unit (Antenna unit region)
CH1: Contact hole
LC: Liquid crystal layer
C: Liquid crystal cell
GD: Gate driver
GL: Gate bus line
GT: Gate terminal
SD: Source driver
SL: Source bus line
ST: Source terminal
PT: Transfer terminal
R1: Transmission/reception region
R2: Non-transmission/reception region
Rs: Seal region
S: Sealant
OM, OM1, OM2: Alignment film
C: Liquid crystal cell

The invention claimed is:

1. A liquid crystal cell comprising:
a liquid crystal layer;
two substrates opposed to each other with the liquid crystal layer sandwiched between the substrates; and
a sealant made of a hardened material including a sealant composition, wherein the sealant is disposed between the substrates to surround the liquid crystal layer and bonded to the substrates,
the sealant composition comprises:
a photo-radical polymerization initiator configured to generate a radical when light with a wavelength of 450 nm or greater is applied; and
a polymerization component including a polymerizable functional group, and
wherein the photo-radical polymerization initiator includes a compound expressed by chemical formula (1):

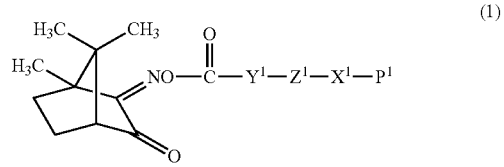

(1)

where $P^1$ is an acryloyl group, a methacryloyl group, an acrylamide group, or a methacrylamide group, $X^1$ and $Y^1$ are structures expressed by chemical formulas (2-1) and (2-2), $Z^1$ is O, COO, NHCO, CONH, S, or a direct bond:

(2-1)

(2-2)

where $n^3$ in chemical formula (2-1) is any one of integers of 1 to 18, H may be replaced with a methyl group or a halogen group, $n^4$ in chemical formula (2-2) is any one of integers of 1 to 18, H may be replaced with a methyl group or a halogen group, if either $X^1$ or $Y^1$ is the structure expressed by chemical formula (2-2), $Z^1$ is CO or a direct bond, and $X^1$ and $Y^1$ do not become the structure expressed by chemical formula (2-2) at the same time.

2. The liquid crystal cell according to claim 1, wherein
one of the substrates is a TFT substrate including a first dielectric substrate, a plurality of TFTs supported by the first dielectric substrate, and a plurality of patch electrodes electrically connected to the plurality of TFTs,
another one of the substrates is a slot substrate including a second dielectric substrate and a slot electrode including a plurality of slots, and
the liquid crystal layer is disposed between the TFT substrate and the slot substrate that are disposed so that the patch electrodes and the slot electrode are opposed to each other and the slots face the patch electrodes.

3. The liquid crystal cell according to claim 1, wherein the liquid crystal layer includes a liquid crystal compound that includes an isothiocyanate group.

4. The liquid crystal cell according to claim 3, wherein the liquid crystal compound that includes the isothiocyanate group includes a structure expressed by either one of chemical formulas (3-1) and (3-2):

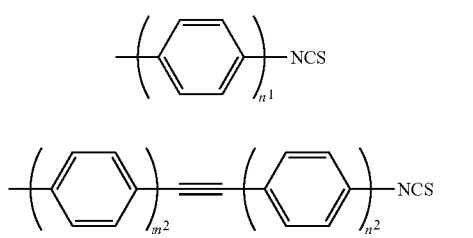

where $n^1$, $m^2$, and $n^2$ in chemical formulas (3-1) and (3-2) are integers from 1 to 5, and H in the phenylene group may be replaced with F or Cl.

5. The liquid crystal cell according to claim 2, wherein the TFT substrate, the slot substrate, or a combination thereof includes an alignment film disposed on a liquid crystal layer side and made of polyimide resin.

6. A method of producing the liquid crystal cell according to claim 1, wherein the sealant includes the sealant composition that is hardened by applying light with a wavelength of 450 nm or greater to the sealant composition.

7. The liquid crystal cell according to claim 1, wherein the compound expressed by chemical formula (1) includes a compound expressed by chemical formula (13)

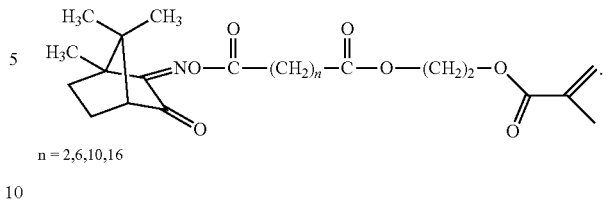

8. The liquid crystal cell according to claim 1, wherein the compound expressed by chemical formula (1) includes a compound expressed by chemical formula (15)

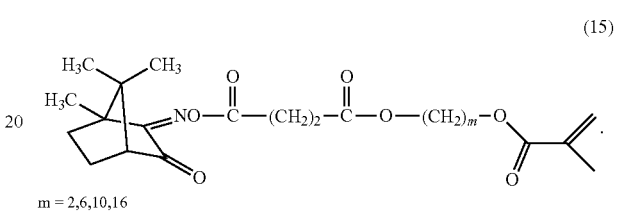

9. The liquid crystal cell according to claim 1, wherein the compound expressed by chemical formula (1) includes a compound expressed by chemical formula (16)

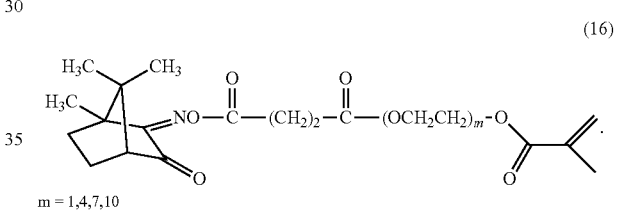

10. The liquid crystal cell according to claim 1, wherein the compound expressed by chemical formula (1) includes a compound expressed by chemical formula (17)

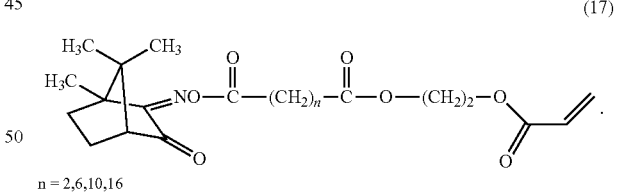

* * * * *